(12) United States Patent
Tateishi et al.

(10) Patent No.: US 12,247,532 B2
(45) Date of Patent: Mar. 11, 2025

(54) VALVE DEVICE

(71) Applicant: DENSO CORPORATION, Kariya (JP)

(72) Inventors: Shogo Tateishi, Kariya (JP); Yuichiro Moritani, Kariya (JP); Hideki Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 220 days.

(21) Appl. No.: 17/879,206

(22) Filed: Aug. 2, 2022

(65) Prior Publication Data
US 2023/0043144 A1 Feb. 9, 2023

(30) Foreign Application Priority Data

Aug. 4, 2021 (JP) ................................. 2021-128440

(51) Int. Cl.
  *F02M 26/54* (2016.01)
  *F02M 26/26* (2016.01)
  *F02M 26/70* (2016.01)
  *F02M 26/72* (2016.01)
  (Continued)

(52) U.S. Cl.
  CPC ............ *F02M 26/54* (2016.02); *F02M 26/26* (2016.02); *F02M 26/70* (2016.02); *F02M 26/72* (2016.02); *F16K 31/52441* (2013.01); *F16K 31/535* (2013.01)

(58) Field of Classification Search
  CPC ........ F02M 26/54; F02M 26/26; F02M 26/70; F02M 26/72; F16K 31/52441; F16K 31/535; Y02T 10/12
  See application file for complete search history.

(56) References Cited

U.S. PATENT DOCUMENTS

| 4,385,496 A | * | 5/1983 | Yamane | .............. F02B 29/0418 60/599 |
| 7,007,680 B2 | * | 3/2006 | Tussing | .................. F02B 33/44 123/563 |

(Continued)

FOREIGN PATENT DOCUMENTS

| DE | 10 2011 007 303 | 12/2011 |
| JP | 2015-59560 | 3/2015 |
| JP | 2020-200814 | 12/2020 |

OTHER PUBLICATIONS

U.S. Appl. No. 17/879,177, filed Aug. 2, 2022, Valve Device.

(Continued)

*Primary Examiner* — Phutthiwat Wongwian
*Assistant Examiner* — Susan E Scharpf
(74) *Attorney, Agent, or Firm* — Nixon & Vanderhye P.C.

(57) ABSTRACT

A valve device increases or decreases a flow rate of EGR gas. The valve device includes a housing, a bypass valve body, an EGR valve body. The housing includes: a first upstream passage into which the EGR gas cooled by an EGR cooler flows; a second upstream passage into which the EGR gas that bypasses the EGR cooler flows; a junction connected to each of a gas-flow downstream of the first upstream passage and a gas-flow downstream of the second upstream passage; and a downstream passage connected to the first upstream passage and the second upstream passage via the junction. The bypass valve body is provided in the second upstream passage. The EGR valve body is provided in the downstream passage.

4 Claims, 15 Drawing Sheets

(51) Int. Cl.
*F16K 31/524* (2006.01)
*F16K 31/53* (2006.01)

(56) References Cited

U.S. PATENT DOCUMENTS

| | | | | |
|---|---|---|---|---|
| 7,140,392 | B2* | 11/2006 | Blomquist | F02M 26/54 |
| | | | | 123/568.24 |
| 7,163,005 | B2* | 1/2007 | Tussing | F02B 33/44 |
| | | | | 123/563 |
| 9,145,854 | B2* | 9/2015 | Hodebourg | F02M 26/64 |
| 9,458,797 | B2* | 10/2016 | Lallemant | F02M 26/71 |
| 9,512,753 | B2* | 12/2016 | Han | F02M 26/30 |
| 9,771,898 | B2* | 9/2017 | Maxim | F02M 26/71 |
| 2004/0107949 | A1* | 6/2004 | Miyoshi | F02M 26/32 |
| | | | | 165/158 |
| 2007/0017489 | A1* | 1/2007 | Kuroki | F02M 26/25 |
| | | | | 123/568.18 |
| 2010/0089370 | A1 | 4/2010 | Furukawa et al. | |
| 2012/0272646 | A1* | 11/2012 | Moritani | F02M 26/64 |
| | | | | 60/605.2 |
| 2013/0047967 | A1* | 2/2013 | Hodebourg | F02M 26/69 |
| | | | | 137/553 |
| 2014/0007835 | A1 | 1/2014 | Bykans et al. | |
| 2015/0000626 | A1 | 1/2015 | Lallemant et al. | |
| 2015/0330336 | A1 | 11/2015 | Girardon et al. | |
| 2016/0138533 | A1 | 5/2016 | Martin et al. | |

OTHER PUBLICATIONS

U.S. Appl. No. 17/879,206, filed Aug. 2, 2022, Valve Device.
U.S. Appl. No. 17/879,223, filed Aug. 2, 2022, Valve Device.
U.S. Appl. No. 17/879,177, to Yuichiro Moritani et al., entitled "Valve Device", filed Aug. 2, 2022 (70 pages).
U.S. Appl. No. 17/879,223, to Hideki Hayashi et al., entitled "Valve Device", filed Aug. 2, 2022 (54 pages).

* cited by examiner

VALVE DEVICE

CROSS REFERENCE TO RELATED APPLICATIONS

This application is based on Japanese Patent Application No. 2021-128440 filed on Aug. 4, 2021, the disclosure of which is incorporated herein by reference.

TECHNICAL FIELD

The present disclosure relates to a valve device that increases or decreases the flow rate of EGR gas.

BACKGROUND

An EGR device has been proposed. An exemplary EGR device includes an EGR passage, an EGR cooler provided in the EGR passage, and an EGR bypass passage that bypasses the EGR cooler. The EGR device also includes a switching valve that is provided in the EGR bypass passage and opens and closes the EGR bypass passage, and an EGR valve that is provided, in the EGR passage, on the downstream side of the EGR cooler and further on the downstream side of a junction that joins the EGR bypass passage.

Since the switching valve and the EGR valve are controlled by a control device, the switching valve and the EGR valve each include an actuator. For example, the actuator of the switching valve is thus disposed near the EGR bypass passage.

SUMMARY

The present disclosure provides a valve device that increases or decreases a flow rate of EGR gas. The valve device includes a housing, a bypass valve body, an EGR valve body. The housing includes: a first upstream passage into which the EGR gas cooled by an EGR cooler flows; a second upstream passage into which the EGR gas that bypasses the EGR cooler flows; a junction connected to each of a gas-flow downstream of the first upstream passage and a gas-flow downstream of the second upstream passage; and a downstream passage connected to the first upstream passage and the second upstream passage via the junction. The bypass valve body is provided in the second upstream passage. The EGR valve body is provided in the downstream passage.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
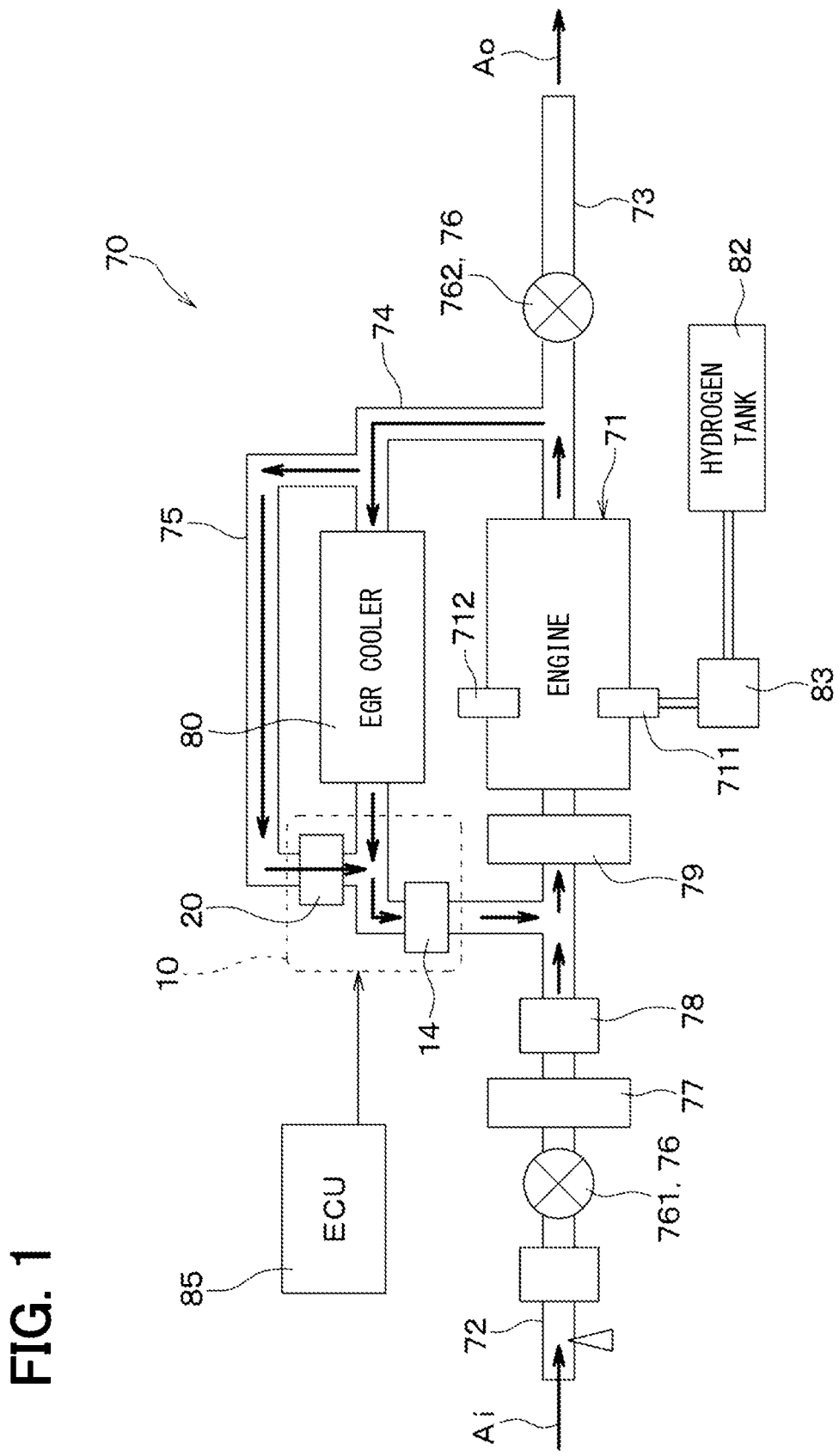
FIG. 1 is a diagram schematically illustrating a schematic configuration of an internal combustion engine system including a valve device in a first embodiment.

For example, in an exemplary EGR device, EGR gas flowing through an EGR bypass passage bypasses an EGR cooler and thus has a high temperature. An actuator of a switching valve provided in the EGR bypass passage is easily affected by heat from the high-temperature EGR gas flowing through the EGR bypass passage. Therefore, the actuator of the switching valve may be thermally damaged, and a failure of the switching valve may occur. As a result of detailed studies by the inventors, the above has been found.

The present disclosure provides a valve device capable of reducing thermal damage due to high-temperature EGR gas having bypassed an EGR cooler.

An exemplary embodiment of the present disclosure provides a valve device that increases or decreases a flow rate of EGR gas. The valve device includes a housing, a bypass valve body, an EGR valve body, a motor, and an interlocking portion. The housing includes a first upstream passage into which the EGR gas cooled by an EGR cooler flows, a second upstream passage into which the EGR gas that bypasses the EGR cooler flows, a junction connected to each of a gas-flow downstream of the first upstream passage and a gas-flow downstream of the second upstream passage, and a downstream passage connected to the first upstream passage and the second upstream passage via the junction. The bypass valve body is provided in the second upstream passage and opens and closes the second upstream passage. The EGR valve body is provided in the downstream passage and rotates around an EGR valve axis to open and close the downstream passage. The motor rotationally drives the EGR valve body. The interlocking portion interlocks the bypass valve body with a rotational operation of the EGR valve body. The motor and the bypass valve body are disposed to be opposite to each other with the junction being interposed between the motor and the bypass valve body.

In the exemplary embodiment of the present disclosure, the motor that operates the bypass valve body is disposed away from the second upstream passage. The motor is thus less likely to be affected by the heat of the high-temperature EGR gas flowing through the second upstream passage as compared with, for example, a case where the motor is disposed adjacent to the second upstream passage. Thus, thermal damage due to the high-temperature EGR gas having bypassed the EGR cooler can be reduced. In addition, both the EGR valve body and the bypass valve body can be operated by the motor, and thus it is possible to prevent an increase in the size of the valve device and reduce the cost of the valve device.

Hereinafter, each embodiment will be described with reference to the drawings. In each of the following embodiments, the same or equivalent parts are denoted by the same reference numerals in the drawings.

First Embodiment

As illustrated in FIG. 1, in the present embodiment, a valve device 10 constitutes a part of an internal combustion engine system 70 that is provided in a vehicle for traveling of the vehicle. The internal combustion engine system 70 generates driving force for traveling by igniting hydrogen as fuel and burning the hydrogen. The internal combustion engine system 70 includes the valve device 10, and also includes an engine 71, an intake passage 72, an exhaust passage 73, an EGR passage 74, a bypass passage 75, a turbocharger 76, an intercooler 77, a throttle valve 78, an intake manifold 79, an EGR cooler 80, and a control device 85.

The engine 71 is a power source for traveling of the vehicle. The engine 71 includes an injector 711 and an ignition plug 712 in order to burn hydrogen, which is fuel. The intake passage 72 is connected to the intake side of the engine 71 via the intake manifold 79, and the exhaust passage 73 is connected to the exhaust side of the engine 71.

In the internal combustion engine system 70, fresh air, which is external air, is sucked from the upstream end of the intake passage 72 as indicated by an arrow Ai, and the fresh air is taken into a combustion chamber of the engine 71 from the intake passage 72 via the intake manifold 79. The fuel (specifically, hydrogen) stored in a fuel tank 82 is decompressed by a decompression valve 83 and then supplied to the injector 711 of the engine 71.

The engine 71 ignites and combusts an air-fuel mixture obtained by mixing the fuel injected from the injector 711 and the intake air taken from the intake passage 72 by the ignition plug 712 in the combustion chamber, thereby generating the driving force for traveling. The exhaust gas after combustion passes through the exhaust passage 73 and is discharged from the downstream end of the exhaust passage 73 to the outside of the vehicle as indicated by an arrow Ao. In FIG. 1, gas flows in the passages 72, 73, 74, and 75 are indicated by thick arrows.

In the intake passage 72, a compressor 761 of the turbocharger 76, the intercooler 77, and the throttle valve 78 are disposed in order from the upstream side. A turbine 762 of the turbocharger 76 is disposed in the exhaust passage 73.

In the turbocharger 76, an impeller of the compressor 761 and an impeller of the turbine 762 are directly connected to each other, and these impellers rotate integrally. As a result, the turbocharger 76 uses an exhaust gas flow in the exhaust passage 73 to promote the suction of air from the outside to the intake passage 72.

The intercooler 77 cools the air passing through the intercooler 77. The throttle valve 78 increases or decreases the opening degree of the intake passage 72, thereby increasing or decreasing the flow rate of the air flowing through the intake passage 72.

The EGR passage 74 is a gas passage for allowing a part of the exhaust gas discharged from the engine 71 to flow to the intake side of the engine 71 as EGR gas. The upstream end of the EGR passage 74 is connected to a gas-flow downstream side of the engine 71 and a gas-flow upstream side of the turbine 762 in the exhaust passage 73. The downstream end of the EGR passage 74 is connected to a gas-flow downstream side of the throttle valve 78 and a gas-flow upstream side of the intake manifold 79 in the intake passage 72. As a result, the EGR gas flows into the intake passage 72 from the EGR passage 74, and is sucked into the engine 71 through the intake manifold 79 together with the fresh air flowing through the intake passage 72.

The EGR cooler 80 is disposed in the EGR passage 74. The EGR cooler 80 is, for example, a heat exchanger, and cools the EGR gas flowing through the EGR passage 74 by heat exchange between a cooling fluid and the EGR gas.

The bypass passage 75 is a gas passage for allowing the EGR gas to flow while bypassing the EGR cooler 80. The upstream end of the bypass passage 75 is thus connected to a gas-flow upstream side of the EGR cooler 80 in the EGR passage 74. The downstream end of the bypass passage 75 is connected to a gas-flow downstream side of the EGR cooler 80 in the EGR passage 74.

In the present embodiment, as the bypass passage 75 allows the EGR gas to flow while bypassing the EGR cooler 80, the temperature of the EGR gas is controlled to be equal to or higher than the dew point on the gas-flow downstream side of a connection portion of the EGR passage 74 to which the downstream end of the bypass passage 75 is connected. As a result, generation of condensed water is suppressed on the gas-flow downstream side of the connection portion. In particular, since the engine 71 of the present embodiment is a hydrogen engine, for example, EGR gas containing about 2.4 times as much water vapor as an existing diesel engine flows into the EGR passage 74 from the exhaust passage 73. Therefore, it is important to suppress generation of condensed water.

The control device 85 includes a microcomputer including a CPU, a ROM, a RAM, and the like (not illustrated), and executes a computer program stored in a semiconductor memory such as a ROM or a RAM, which is a non-transitory tangible recording medium. The control device 85 functions as an engine control device that executes various control related to the engine 71, and executes operation control of, for example, the engine 71, the throttle valve 78, the valve device 10, and the like.

The valve device 10 increases or decreases the flow rate of the EGR gas flowing through the bypass passage 75, and also increases or decreases the flow rate (that is, the EGR flow rate) of the EGR gas flowing from the EGR passage 74 to the intake passage 72. The valve device 10 is thus provided at a passage connecting portion at which the EGR passage 74 and the bypass passage 75 are connected on the gas-flow downstream side of the EGR cooler 80.

Figure 2:
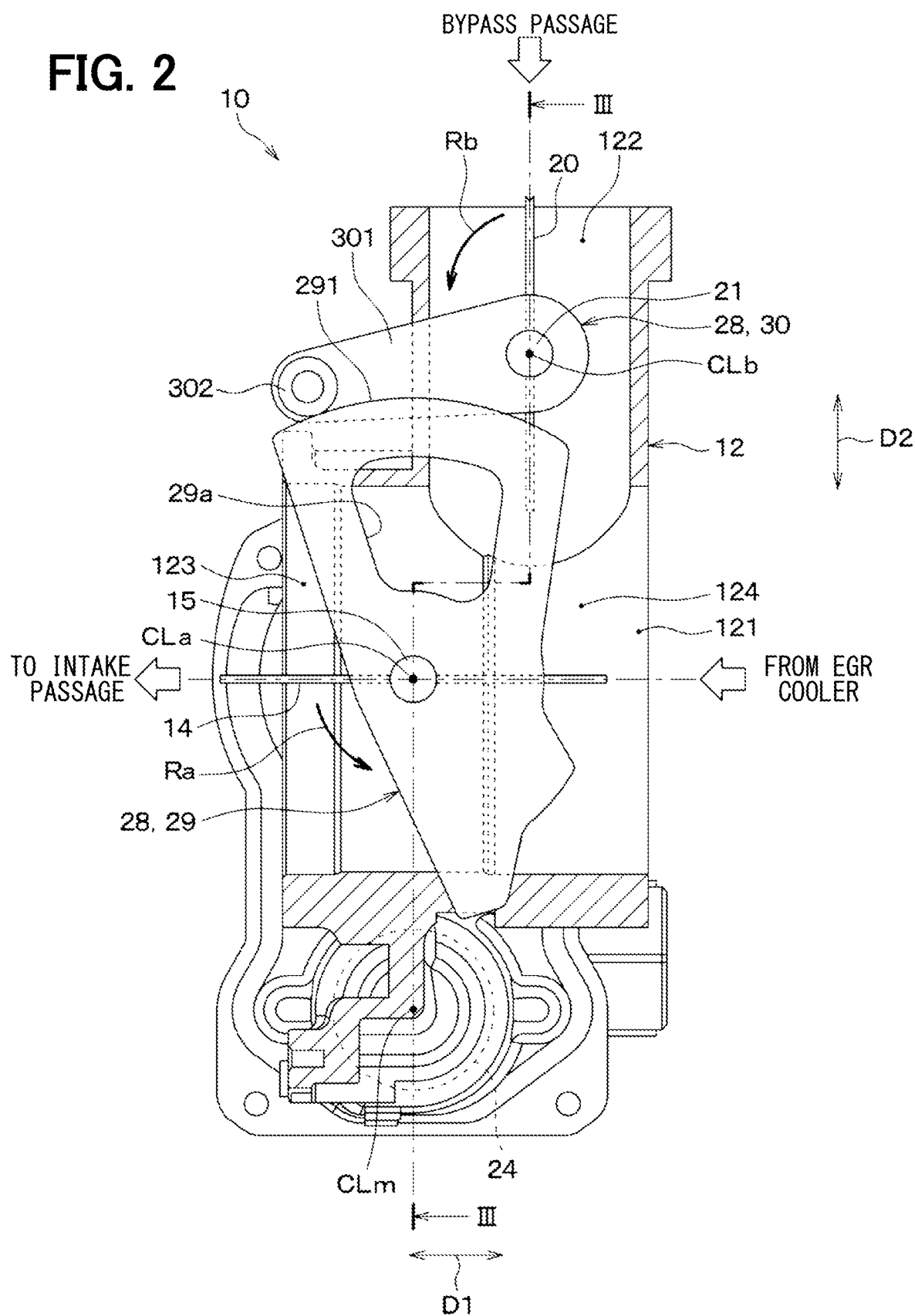
FIG. 2 is a diagram illustrating the valve device of the first embodiment, and is a partial cross-sectional view of a housing of the valve device, taken along a line perpendicular to an EGR valve axis.
Figure 3:
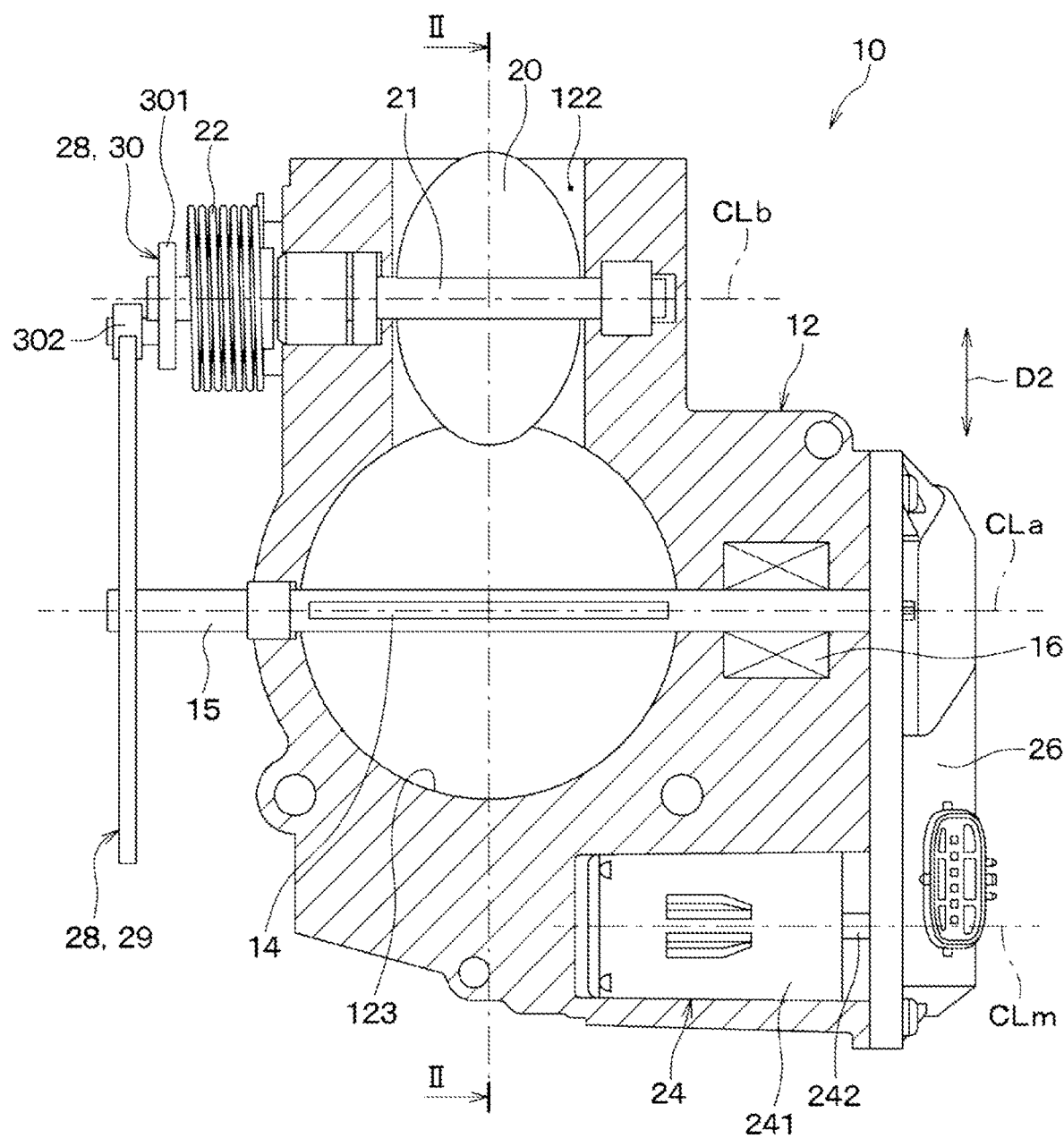
FIG. 3 is a diagram of the valve device of the first embodiment as viewed from a side of a first upstream passage, and is a partial cross-sectional view of the housing of the valve device taken along line III-III in FIG. 2.

As illustrated in FIGS. 2 and 3, the valve device 10 includes a housing 12, an EGR valve body 14, an EGR valve shaft 15, an EGR valve urging portion 16, a bypass valve body 20, a bypass valve shaft 21, a bypass valve urging portion 22, a motor 24, a speed reduction device 26, and an interlocking portion 28. In FIG. 2, the housing 12 is illustrated in a cross-section taken along line II-II in FIG. 3.

As illustrated in FIGS. 1 to 3, the housing 12 forms an outer shell of the valve device 10 and is a non-rotating member that does not rotate. A first upstream passage 121, a second upstream passage 122, a downstream passage 123, and a junction 124 through which EGR gas flows are formed inside the housing 12. That is, the housing 12 is a passage forming portion with the plurality of passages 121, 122, and 123 formed therein.

The first upstream passage 121, the junction 124, and the downstream passage 123 are connected in series from the gas-flow upstream side in the order of the first upstream passage 121, the junction 124, and the downstream passage 123 along a first passage direction D1, and form one linearly extending passage. That is, the direction of the first upstream passage 121 and the direction of the downstream passage 123 are the same, and both are the first passage direction D1. The first upstream passage 121 is connected in series to the downstream passage 123 via the junction 124.

The first upstream passage 121, the junction 124, and the downstream passage 123 constitute a part of the EGR passage 74 on the gas-flow downstream side of the EGR cooler 80. The EGR gas cooled by the EGR cooler 80 thus flows into the first upstream passage 121. For example, one passage including the first upstream passage 121, the junction 124, and the downstream passage 123 has a circular shape in a cross-section perpendicular to the first passage direction D1.

The second upstream passage 122 includes a downstream end of the bypass passage 75 and constitutes a part of the bypass passage 75. The EGR gas having bypassed the EGR cooler 80 thus flows into the second upstream passage 122.

The second upstream passage 122 is also a passage linearly extending along a second passage direction D2. The second passage direction D2 is a direction intersecting the first passage direction D1, strictly speaking, a direction perpendicular to the first passage direction D1. That is, the direction of the second upstream passage 122 is the second passage direction D2, and the second upstream passage 122 is disposed in a direction intersecting the first upstream passage 121 and the downstream passage 123.

For example, the second upstream passage 122 has a circular shape in a cross-section perpendicular to the second passage direction D2. The second upstream passage 122 has a smaller diameter than the first upstream passage 121 and the downstream passage 123.

Figure 4:
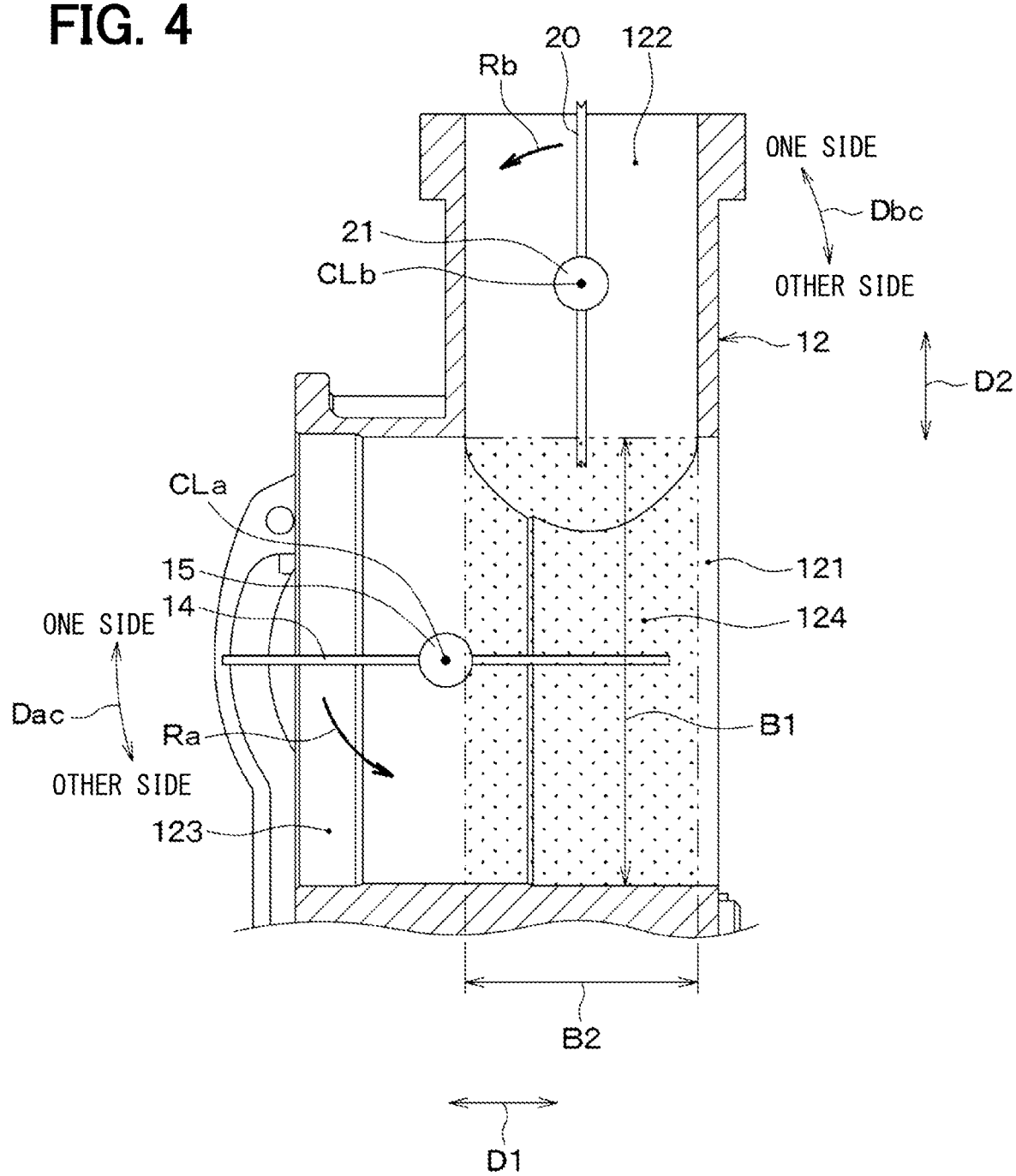
FIG. 4 is a partial cross-sectional view in which an interlocking portion and a part of the housing are omitted from FIG. 2.

As illustrated in FIGS. 2 to 4, the downstream passage 123 is connected to the gas-flow downstream side of the first upstream passage 121 and the second upstream passage 122 via the junction 124. That is, the junction 124 is connected to each of the gas-flow downstream side of the first upstream passage 121, the gas-flow downstream side of the second upstream passage 122, and the gas-flow upstream side of the downstream passage 123. In short, the junction 124 is a space at which the first upstream passage 121 and the second upstream passage 122 among the passages formed in the housing 12 join each other. The EGR gas flowing out of the first upstream passage 121 and the EGR gas flowing out of the second upstream passage 122 thus merges and flows into the downstream passage 123.

As illustrated in FIG. 4, for example, the junction 124 is formed as a space in which a space B1 obtained by virtually extending the first upstream passage 121 along the direction of the first upstream passage 121 and a space B2 obtained by virtually extending the second upstream passage 122 along the direction of the second upstream passage 122 overlap each other. The direction of the first upstream passage 121 is the first passage direction D1, and the direction of the second upstream passage 122 is the second passage direction D2. In FIG. 4, and FIGS. 5, 12, and 15 to be described later, dotted hatching is applied to the junction 124.

As illustrated in FIGS. 2 to 4, the EGR valve body 14 is disposed in the downstream passage 123 and rotates around an EGR valve axis CLa. The EGR valve body 14 rotates around the EGR valve axis CLa to open and close the downstream passage 123. In other words, the EGR valve body 14 rotates around the EGR valve axis CLa to increase or decrease the opening degree of the downstream passage 123. The EGR valve axis CLa is an axis along a valve shaft direction Da perpendicular to the first passage direction D1 and the second passage direction D2. The EGR valve axis CLa is located at the center of the width of the downstream passage 123 in the second passage direction D2.

Specifically, the EGR valve body 14 is a butterfly valve body, and for example, is formed in a circular shape conforming to the cross-sectional shape of the downstream passage 123 and in a plate shape along the valve shaft direction Da. The plate shape along the valve shaft direction Da is, in other words, a plate shape with a thickness in a direction perpendicular to the EGR valve axis CLa.

The EGR valve shaft 15 is a rotating shaft rotatably supported by the housing 12. The EGR valve body 14 is fixed to the EGR valve shaft 15 by screwing or the like, and the EGR valve shaft 15 and the EGR valve body 14 integrally rotate about the EGR valve axis CLa. The EGR valve shaft 15 extends from a fixed position of the EGR valve body 14 to each of both sides in the valve shaft direction Da, and is rotatably supported by the housing 12 on each of both sides of the EGR valve body 14 in the valve shaft direction Da.

The EGR valve urging portion 16 functions as a return spring that urges the EGR valve body 14, and includes, for example, one or a plurality of torsion coil springs. The EGR valve urging portion 16 is housed in the housing 12. The EGR valve urging portion 16 constantly urges the EGR valve body 14 to one side in a circumferential direction Dac of the EGR valve axis CLa. The EGR valve urging portion 16 thus constantly urges the EGR valve body 14 via the EGR valve shaft 15 so that the EGR valve body 14 returns to a predetermined reference rotational position. For example, when the EGR valve body 14 is at the reference rotational position, the EGR valve body 14 or the EGR valve shaft 15 is pressed against a stopper (not illustrated) opposing the urging force of the EGR valve urging portion 16 in the circumferential direction Dac of the EGR valve axis CLa. Therefore, when the motor 24 is not energized and is not driven, the EGR valve body 14 is returned to the reference rotational position of the EGR valve body 14 by the urging force of the EGR valve urging portion 16.

The reference rotational position of the EGR valve body 14 in the present embodiment is a rotational position at which the EGR valve body 14 fully opens the downstream passage 123, specifically, a rotational position of the EGR valve body 14 shown in FIG. 2. That is, when the EGR valve body 14 is at the reference rotational position, the downstream passage 123 is fully opened. In the description of the present embodiment, the circumferential direction Dac of the EGR valve axis CLa is also referred to as "EGR valve circumferential direction Dac".

The fully open state of the downstream passage 123 means that the opening degree of the downstream passage 123 is 100%, that is, the opening degree of the downstream passage 123 is set to the maximum opening degree within the movable range of the EGR valve body 14. The fully closed state of the downstream passage 123 means that the opening degree of the downstream passage 123 is 0%, and in the fully closed state of the downstream passage 123, the flow of the EGR gas is blocked in the downstream passage 123 except for the leakage of the EGR gas. The fully open and fully closed states of the second upstream passage 122 are similar to the fully open and fully closed states of the downstream passage 123.

For example, in the present embodiment, the EGR valve body 14 does not rotate from the reference rotational position of the EGR valve body 14 to one side in the EGR valve circumferential direction Dac, and is rotatable within the range of 90 degrees or less from the reference rotational position to the other side in the EGR valve circumferential direction Dac. As indicated by an arrow Ra, as the EGR valve body 14 rotates from the reference rotational position to the other side in the EGR valve circumferential direction Dac, the opening degree of the downstream passage 123 decreases.

The bypass valve body 20 is disposed in the second upstream passage 122 and rotates around a bypass valve axis CLb parallel to the EGR valve axis CLa. The bypass valve body 20 rotates around the bypass valve axis CLb to open and close the second upstream passage 122. In other words, the bypass valve body 20 rotates around the bypass valve axis CLb to increase or decrease the opening degree of the second upstream passage 122. The bypass valve axis CLb is located at the center of the width of the second upstream passage 122 in the first passage direction D1. In the present embodiment, since the EGR valve axis CLa and the bypass valve axis CLb are parallel to each other, the valve shaft direction Da is the axial direction of the EGR valve axis CLa and is also the axial direction of the bypass valve axis CLb.

Specifically, the bypass valve body 20 is a butterfly valve body. For example, when the EGR valve body 14 is at the reference rotational position, the bypass valve body 20 fully opens the second upstream passage 122. When the EGR valve body 14 then rotates from the reference rotational position to the other side in the EGR valve circumferential direction Dac, the bypass valve body 20 accordingly rotates to one side in the circumferential direction Dbc of the bypass valve axis CLb as indicated by an arrow Rb. The opening degree of the second upstream passage 122 decreases as the bypass valve body 20 rotates to one side in the circumferential direction Dbc of the bypass valve axis CLb from the rotational position in FIG. 2 at which the second upstream passage 122 is fully opened.

When the EGR valve body 14 is returned to the reference rotational position by the urging force of the EGR valve urging portion 16 when the motor 24 is not driven, at the same time, the bypass valve body 20 is returned to the rotational position at which the second upstream passage 122 is fully opened. Specifically, the rotational position at which the bypass valve body 20 fully opens the second upstream passage 122 is the rotational position of the bypass valve body 20 shown in FIG. 2. In the description of the present embodiment, the circumferential direction Dbc of the bypass valve axis CLb is also referred to as "bypass valve circumferential direction Dbc".

As illustrated in FIGS. 2 to 4, the bypass valve shaft 21 is a rotating shaft rotatably supported by the housing 12. The bypass valve body 20 is fixed to the bypass valve shaft 21 by screwing or the like, and the bypass valve shaft 21 and the bypass valve body 20 integrally rotate about the bypass valve axis CLb. The bypass valve shaft 21 extends from a fixed position of the bypass valve body 20 to each of both sides in the valve shaft direction Da, and is rotatably supported by the housing 12 on each of both sides of the bypass valve body 20 in the valve shaft direction Da.

The bypass valve urging portion 22 includes, for example, a torsion coil spring or the like. The bypass valve urging portion 22 is disposed outside the housing 12 and supported by the housing 12. The bypass valve urging portion 22 constantly urges the bypass valve body 20 via the bypass valve shaft 21 so that the bypass valve body 20 rotates to one side in the bypass valve circumferential direction Dbc.

The motor 24 is a drive source that rotationally operates the EGR valve body 14 and the bypass valve body 20. The motor 24 is housed in the housing 12, and includes a motor body 241 fixed to the housing 12, a motor shaft 242 that rotates around a motor axis CLm that is a rotation center of the motor 24, and a motor rotation sensor (not illustrated) that detects the rotation angle of the motor shaft 242. The motor axis CLm is parallel to the EGR valve axis CLa.

The motor 24 rotates the motor shaft 242 based on a signal from the control device 85 in FIG. 1, and outputs a signal indicating the rotation angle of the motor shaft 242 detected by the motor rotation sensor to the control device 85. The rotation angle and the rotation direction of the motor shaft 242 are thus controlled by the control device 85. For example, when rotationally operating the EGR valve body 14 and the bypass valve body 20 against the urging force of the EGR valve urging portion 16, the motor 24 generates a torque that overcomes the urging force.

The motor 24 can also keep the rotation angle of the motor shaft 242 as it is by being energized, and when the motor 24 is not energized, the rotation angle of the motor shaft 242 is not kept and the motor shaft 242 can freely rotate.

The motor shaft 242 is connected to the EGR valve shaft 15 via the speed reduction device 26 so as to be capable of transmitting power. The speed reduction device 26 includes a plurality of gears that are always meshed with each other, and decelerates the rotation of the motor shaft 242 and transmits the rotation to the EGR valve shaft 15. The speed reduction device 26 also includes a case constituting a part of the outer shell of the valve device 10, and the gears included in the speed reduction device 26 are housed in the case.

The EGR valve shaft 15 is connected to the interlocking portion 28 so as to be capable of transmitting power on one side in the valve shaft direction Da of the position of the EGR valve shaft 15 fixed to the EGR valve body 14, and is connected to the speed reduction device 26 so as to be capable of transmitting power on the other side in the valve shaft direction Da of the fixed position of the EGR valve body 14. The interlocking portion 28 then connects the EGR valve shaft 15 and the bypass valve shaft 21 so as to be capable of transmitting power. Therefore, the rotational driving force of the motor 24 is transmitted to the motor shaft 242, the speed reduction device 26, the EGR valve shaft 15, the interlocking portion 28, and the bypass valve shaft 21 in this order.

Figure 5:
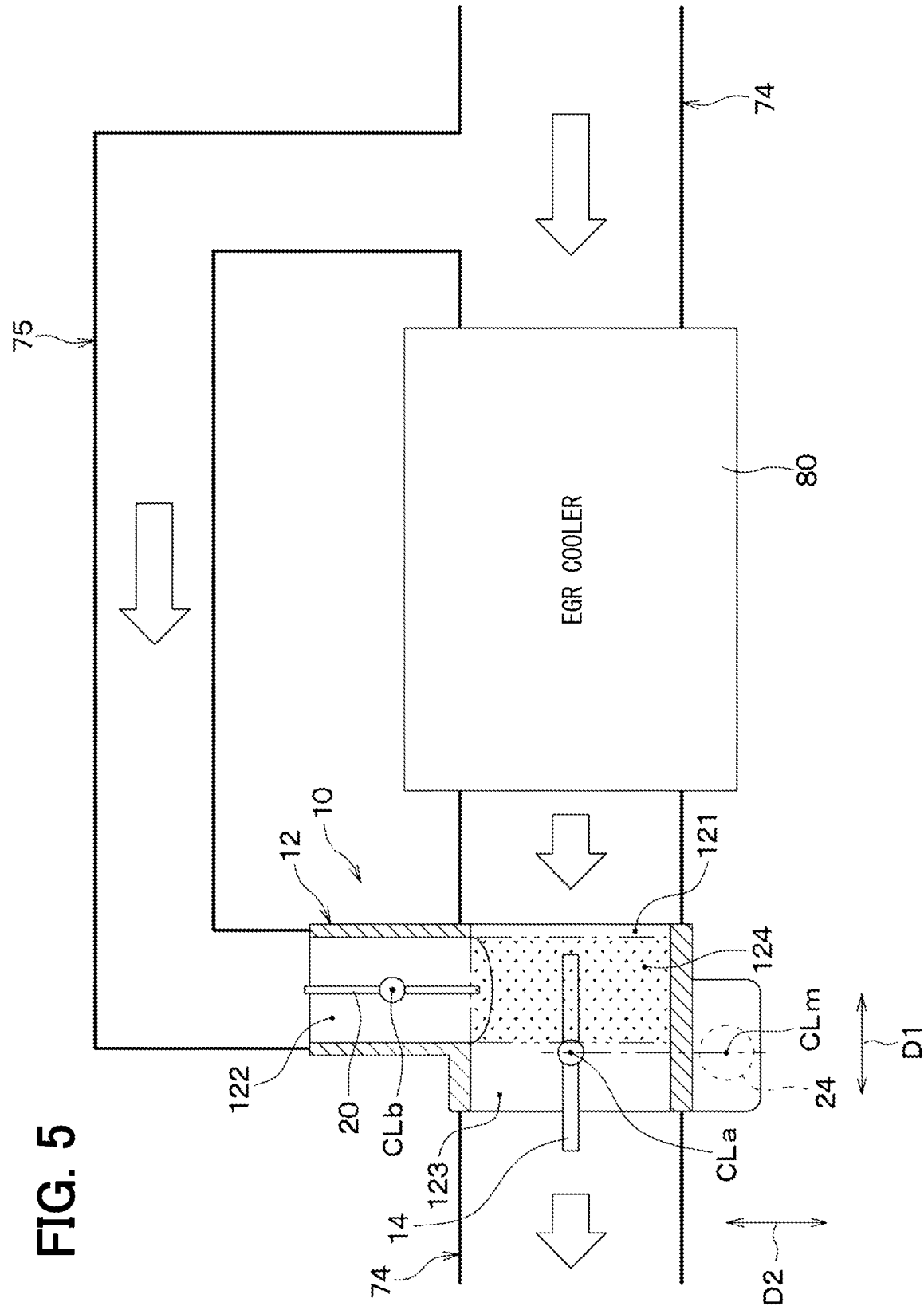
FIG. 5 is a diagram illustrating an EGR cooler, a bypass passage, and the valve device extracted from FIG. 1 and illustrating the valve device in a schematic cross-section.
Figure 12:
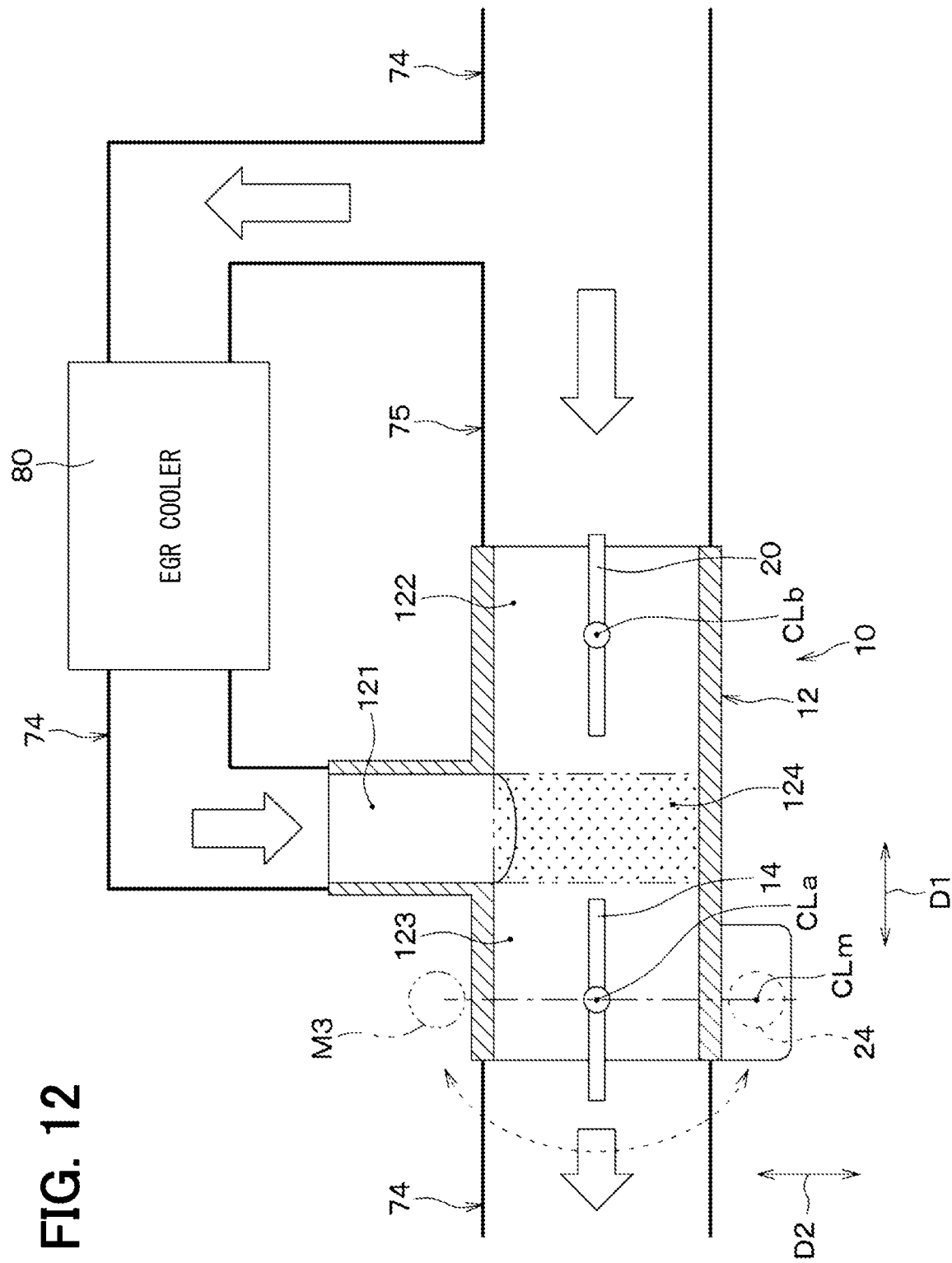
FIG. 12 is a diagram illustrating an EGR cooler, a bypass passage, and a valve device in extracted manner, illustrating the valve device in a schematic cross-section in a seventh embodiment, and corresponding to FIG. 5.
Figure 15:
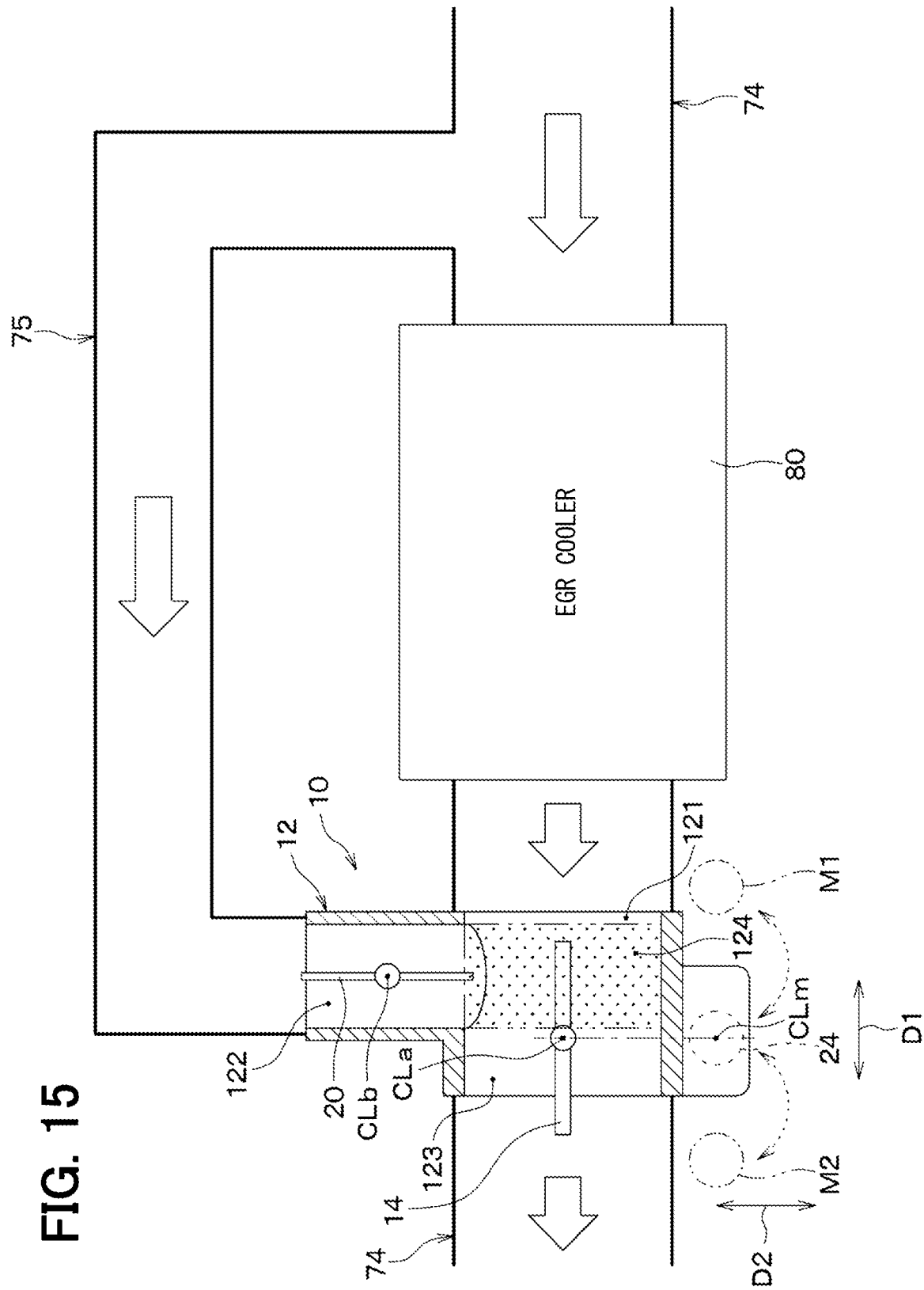
FIG. 15 is a diagram schematically illustrating an EGR cooler, a bypass passage, and a valve device in an extracted manner in order to describe other embodiments and corresponding to FIG. 5.

As illustrated in FIGS. 2 and 5, the motor 24 and the bypass valve body 20 are disposed to be opposite to each other with the junction 124 being provided therebetween. The motor axis CLm is arranged side by side with the EGR valve axis CLa in the second passage direction D2 that is a direction perpendicular to the direction of the downstream passage 123 (that is, the first passage direction D1). In FIG. 5, and FIGS. 12 and 15 to be described later, white arrows indicate the flow of the EGR gas.

As illustrated in FIGS. 2 and 3, the interlocking portion 28 is an interlocking mechanism that interlocks the bypass valve body 20 with the rotational operation of the EGR valve body 14. Specifically, the interlocking portion 28 of the present embodiment is configured as a cam link mechanism, and includes a cam 29 and a driven rotating portion 30 that is driven by the rotation of the cam 29.

The cam 29 has a flat plate shape with a thickness in the valve shaft direction Da, and is fixed to the EGR valve shaft 15. The cam 29 thus rotates around the EGR valve axis CLa integrally with the EGR valve body 14 and the EGR valve shaft 15. The cam 29 has a cam track 291 formed on a peripheral edge of the cam 29. The cam track 291 is also referred to as "profile of cam 29". The cam 29 includes a cam through-hole 29a penetrating in the valve shaft direction Da, which is the axial direction of the EGR valve axis CLa, as a cutout of the cam 29, for example.

The driven rotating portion 30 includes a lever 301 that is formed in a flat plate shape and has a thickness in the valve shaft direction Da, and a roller 302 as a cam follower rotatably supported by the lever 301. The roller 302 rotates relative to the lever 301 around an axis parallel to the bypass valve axis CLb, and the axis of the roller 302 is disposed to be radially shifted with respect to the bypass valve axis CLb.

The lever 301 is fixed to the bypass valve shaft 21. The lever 301 thus rotates around the bypass valve axis CLb integrally with the bypass valve body 20 and the bypass valve shaft 21.

The bypass valve urging portion 22 urges the bypass valve body 20 fixed to the bypass valve shaft 21 as described above, and also urges the lever 301 fixed to the bypass valve shaft 21. That is, the bypass valve urging portion 22 constantly urges the lever 301 via the bypass valve shaft 21 so that the lever 301 rotates to one side in the bypass valve circumferential direction Dbc (see FIG. 4). As a result, since the roller 302 of the driven rotating portion 30 is constantly pressed against the cam track 291, the driven rotating portion 30 rotates in an interlocking manner with the rotational operation of the cam 29 while causing the roller 302 to follow the cam track 291.

In the valve device 10 configured as described above, as illustrated in FIGS. 2 to 4, when the motor 24 is energized to rotate the motor shaft 242, the rotation of the motor shaft 242 is transmitted to the EGR valve shaft 15 via the speed reduction device 26, and the EGR valve shaft 15 rotates. The EGR valve body 14 and the cam 29 thus rotate around the EGR valve axis CLa integrally with the EGR valve shaft 15.

The opening degree of the downstream passage 123 is changed by the rotation of the EGR valve body 14. When the cam 29 rotates, the lever 301 of the driven rotating portion 30 rotates in an interlocking manner with the rotational operation of the cam 29 while causing the roller 302 to follow the cam track 291. The bypass valve body 20 and the bypass valve shaft 21 thus rotate around the bypass valve axis CLb integrally with the lever 301. The opening degree of the second upstream passage 122 is changed by the rotation of the bypass valve body 20.

As illustrated above, according to the present embodiment, the motor 24 and the bypass valve body 20 are disposed to be opposite to each other with the junction 124 being interposed therebetween, as illustrated in FIGS. 2 and 5. As a result, the motor 24 that rotates the EGR valve body 14 and the bypass valve body 20 is disposed away from the second upstream passage 122. The motor 24 is thus less likely to be affected by the heat of the high-temperature EGR gas flowing through the second upstream passage 122 as compared with, for example, a case where the motor is disposed adjacent to the second upstream passage 122. Thus, thermal damage due to the high-temperature EGR gas having bypassed the EGR cooler 80 can be reduced.

In the valve device 10 of the present embodiment, since both the EGR valve body 14 and the bypass valve body 20 can be operated by one motor 24, it is possible to prevent an increase in the size of the valve device 10 and reduce the cost of the valve device 10.

The EGR gas that has bypassed the EGR cooler 80 is mixed with the EGR gas that has passed through the EGR cooler 80 at the junction 124 in the housing 12. On the gas-flow downstream side of the junction 124, it is possible to avoid generation of condensed water by raising the temperature of the EGR gas to the dew point limit.

Since the EGR valve body 14 is provided in the downstream passage 123 and the bypass valve body 20 is provided in the second upstream passage 122, the flow rate of the EGR gas passing through the EGR cooler 80 can be adjusted without providing a valve body in the first upstream passage 121. As compared with a case where the valve body is provided in the first upstream passage 121, even if condensed water is generated, malfunction of the valve device 10 due to solidification of the condensed water can be easily avoided.

(1) According to the present embodiment, the motor axis CLm is parallel to the EGR valve axis CLa, and is arranged side by side with the EGR valve axis CLa in a direction perpendicular to the direction of the downstream passage 123 (that is, the second passage direction D2). The EGR valve body 14 and the motor 24 that rotationally drives the EGR valve body 14 can thus be disposed adjacent to each other at the shortest distance. As a result, for example, the volume required for providing the motor 24 can be reduced.

(2) According to the present embodiment, as illustrated in FIGS. 2 and 3, the interlocking portion 28 includes the cam 29 that rotates together with the EGR valve body 14 and includes the cam track 291, and the driven rotating portion 30 that rotates together with the bypass valve body 20 and includes the roller 302. The driven rotating portion 30 rotates in an interlocking manner with the rotational operation of the cam 29 while causing the roller 302 to follow the cam track 291.

It is thus easy to interlock the EGR valve body 14 with the bypass valve body 20 depending on the shape of the cam track 291 so that the rotation amount of the EGR valve body 14 and the rotation amount of the bypass valve body 20 have a non-linear relationship, for example. In short, it is possible to flexibily set the passage opening degree characteristic that is the relationship between the opening degree of the second upstream passage 122 and the opening degree of the downstream passage 123.

Second Embodiment

Next, a second embodiment will be described. The present embodiment will mainly describe differences from the first embodiment. In addition, the same or equivalent parts as those in the embodiment described above will be omitted or simplified. The same applies to the description of embodiments to be described later.

Figure 6:
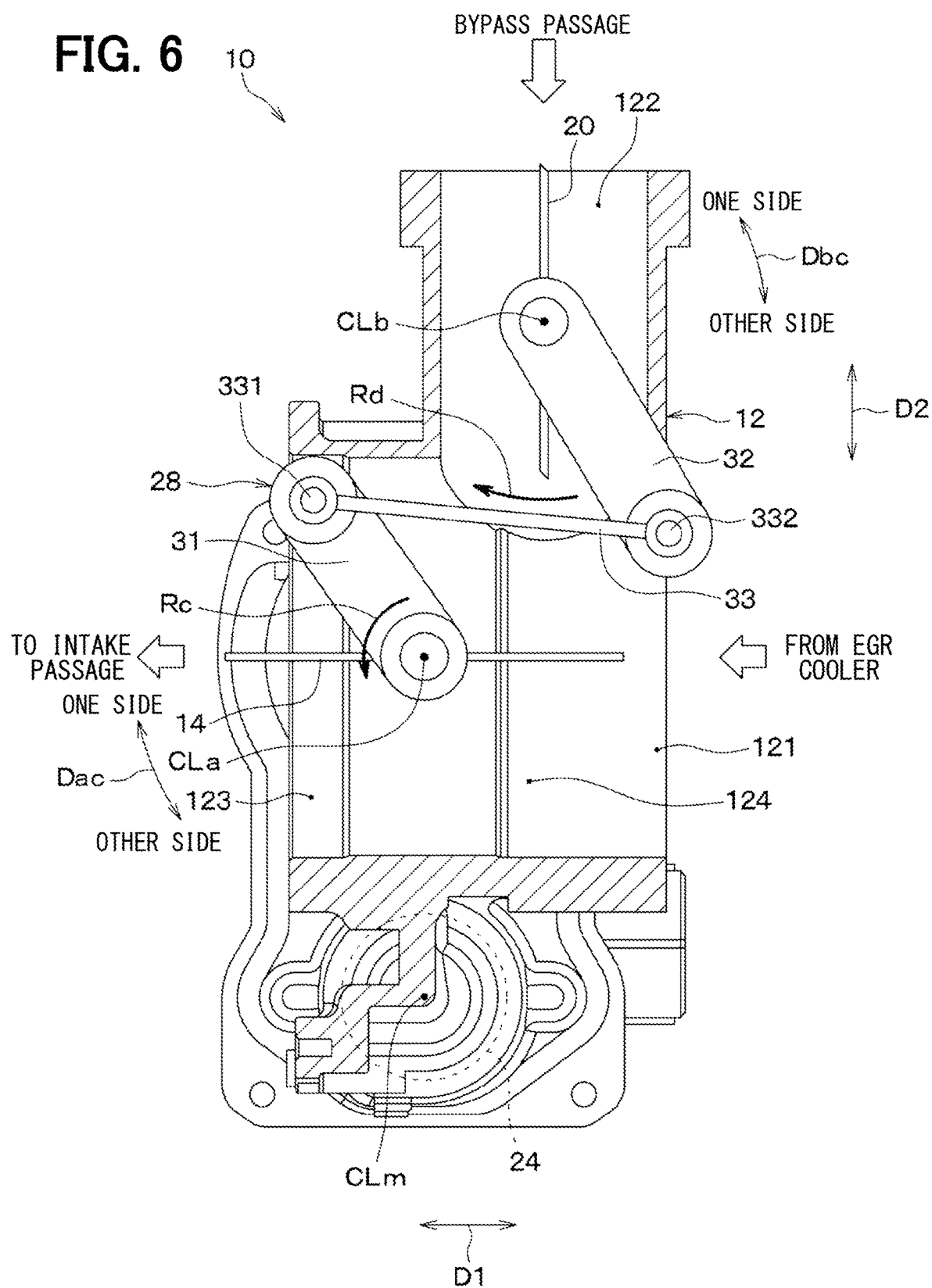
FIG. 6 is a cross-sectional view of a housing in a valve device taken along a line perpendicular to an EGR valve axis in a second embodiment, corresponding to FIG. 2.

As illustrated in FIG. 6, the present embodiment is different from the first embodiment in the structure of the interlocking portion 28. That is, the interlocking portion 28 of the present embodiment is configured not as a cam link mechanism but as a lever link mechanism.

Specifically, the interlocking portion 28 of the present embodiment does not include the cam 29 and the driven rotating portion 30 (see FIG. 2), but includes a first arm 31, a second arm 32, and a connecting lever 33.

The first arm 31 is fixed to the EGR valve shaft 15. The first arm 31 thus rotates around the EGR valve axis CLa integrally with the EGR valve body 14 and the EGR valve shaft 15. The second arm 32 is fixed to the bypass valve shaft 21. The second arm 32 thus rotates around the bypass valve axis CLb integrally with the bypass valve body 20 and the bypass valve shaft 21.

The connecting lever 33 connects the EGR valve body 14 and the bypass valve body 20. The connecting lever 33 thus includes one end portion 331 rotatably connected to the first arm 31 and the other end portion 332 rotatably connected to the second arm 32. One end portion 331 of the connecting lever 33 is disposed eccentrically from the EGR valve axis CLa, and the other end portion 332 of the connecting lever 33 is disposed eccentrically from the bypass valve axis CLb.

With such a configuration, the interlocking portion 28 of the present embodiment interlocks the bypass valve body 20 with the rotational operation of the EGR valve body 14 via the connecting lever 33. For example, when the EGR valve body 14 rotates from the reference rotational position to the other side in the EGR valve circumferential direction Dac as indicated by an arrow Rc, the bypass valve body 20 rotates from a rotational position at which the second upstream passage 122 is fully opened to the other side in the bypass valve circumferential direction Dbc as indicated by an arrow Rd.

(1) As described above, according to the present embodiment, the interlocking portion 28 interlocks the bypass valve body 20 with the rotational operation of the EGR valve body 14 via the connecting lever 33, and thus the length of the connecting lever 33 may be determined based on the distance between the EGR valve axis CLa and the bypass valve axis CLb. As a result, it is possible to flexibly set the distance between the EGR valve axis CLa and the bypass valve axis CLb.

The present embodiment is similar to the first embodiment except for the above description. In the present embodiment, the same effects as those of the first embodiment can be obtained from the same configuration as that of the first embodiment.

Third Embodiment

Next, a third embodiment will be described. The present embodiment will mainly describe differences from the first embodiment.

Figure 7:
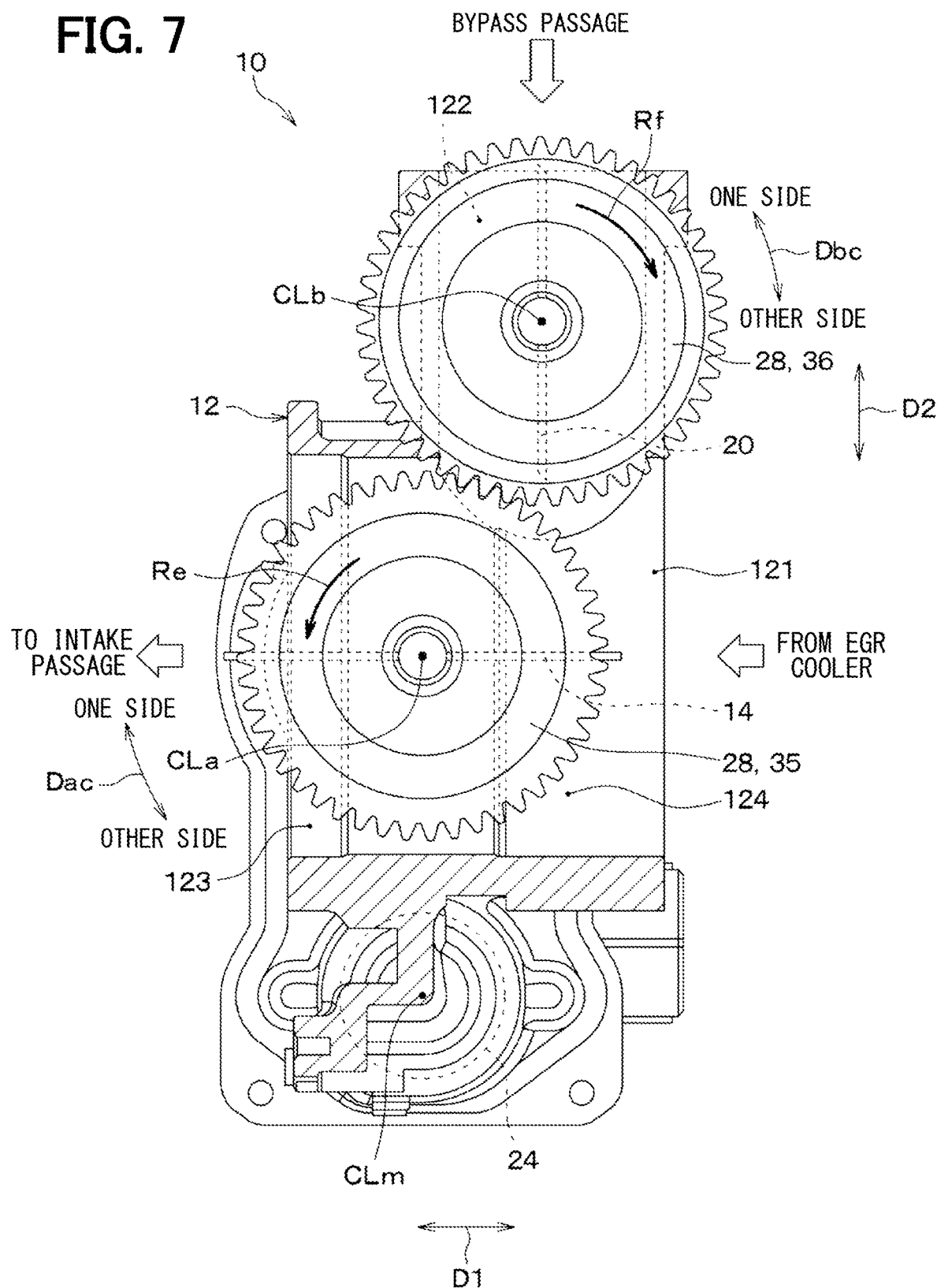
FIG. 7 is a cross-sectional view of a housing in a valve device, taken along a line perpendicular to the EGR valve axis in a third embodiment, corresponding to FIG. 2.

As illustrated in FIG. 7, the present embodiment is different from the first embodiment in the structure of the interlocking portion 28. That is, the interlocking portion 28 of the present embodiment is configured not as a cam link mechanism but as a gear link mechanism.

Specifically, the interlocking portion 28 of the present embodiment does not include the cam 29 and the driven rotating portion 30 (see FIG. 2), but includes a drive gear 35 and a driven gear 36.

The drive gear 35 is fixed to the EGR valve shaft 15. The drive gear 35 thus rotates around the EGR valve axis CLa integrally with the EGR valve body 14 and the EGR valve shaft 15. The driven gear 36 is fixed to the bypass valve shaft 21. The driven gear 36 thus rotates around the bypass valve axis CLb integrally with the bypass valve body 20 and the bypass valve shaft 21. Further, the drive gear 35 and the driven gear 36 are always meshed with each other.

With such a configuration, the interlocking portion 28 of the present embodiment interlocks the bypass valve body 20 with the rotational operation of the EGR valve body 14 via the drive gear 35 and the driven gear 36. For example, when the EGR valve body 14 rotates from the reference rotational position to the other side in the EGR valve circumferential direction Dac as indicated by an arrow Re, the bypass valve body 20 rotates from a rotational position at which the second upstream passage 122 is fully opened to the other side in the bypass valve circumferential direction Dbc as indicated by an arrow Rf.

(1) As described above, according to the present embodiment, the interlocking portion 28 includes the drive gear 35 that rotates together with the EGR valve body 14 and the driven gear 36 that rotates together with the bypass valve body 20 and meshes with the drive gear 35. Since the torque fluctuation of the motor 24 that rotates the EGR valve body 14 and the bypass valve body 20 is small, high controllability at the time of the rotational operation of the EGR valve body 14 and the bypass valve body 20 is achieved.

The present embodiment is similar to the first embodiment except for the above description. In the present embodiment, the same effects as those of the first embodiment can be obtained from the same configuration as that of the first embodiment.

Fourth Embodiment

Next, a fourth embodiment will be described. The present embodiment will mainly describe differences from the first embodiment.

Figure 8:
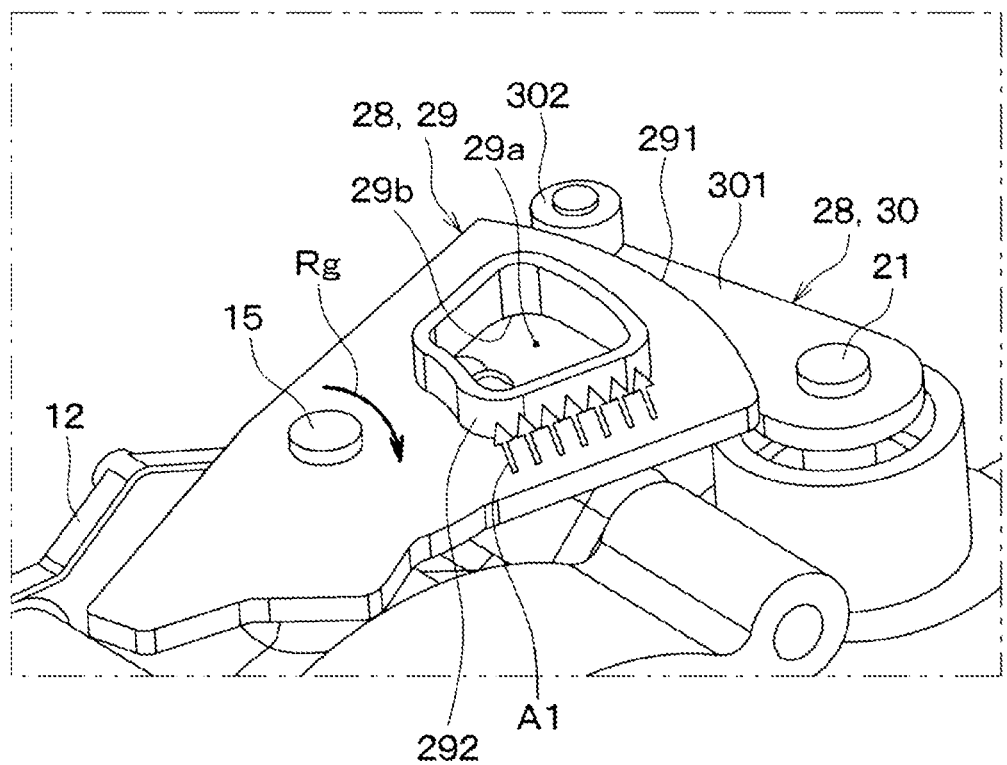
FIG. 8 is a perspective view illustrating an interlocking portion and its periphery in an extracted manner in a fourth embodiment.

As illustrated in FIG. 8, the cam 29 includes a cam projection 292 in the present embodiment. The cam projection 292 projects from a peripheral edge 29b of the cam through-hole 29a to one side in the valve shaft direction Da (see FIG. 3). The cam projection 292 extends along the peripheral edge 29b of the cam through-hole 29a. For example, the cam projection 292 is provided over the entire circumference of the cam through-hole 29a, and is formed in a tubular shape extending in the valve shaft direction Da.

(1) The cam 29 includes the cam projection 292 as described above, and thus it is possible to increase the surface area of a portion that comes into contact with air when the valve is operated. As a result, it is possible to enhance the cooling effect of dissipating the heat of the valve device 10 to the outside.

For example, when the cam 29 rotates together with the EGR valve shaft 15 as indicated by an arrow Rg, an air flow A1 is generated relatively to the cam projection 292 and the air flow A1 hits the cam projection 292, so that heat dissipation from the cam 29 is promoted.

The present embodiment is similar to the first embodiment except for the above description. In the present embodiment, the same effects as those of the first embodiment can be obtained from the same configuration as that of the first embodiment.

Fifth Embodiment

Next, a fifth embodiment will be described. The present embodiment will mainly describe differences from the first embodiment.

Figure 9:
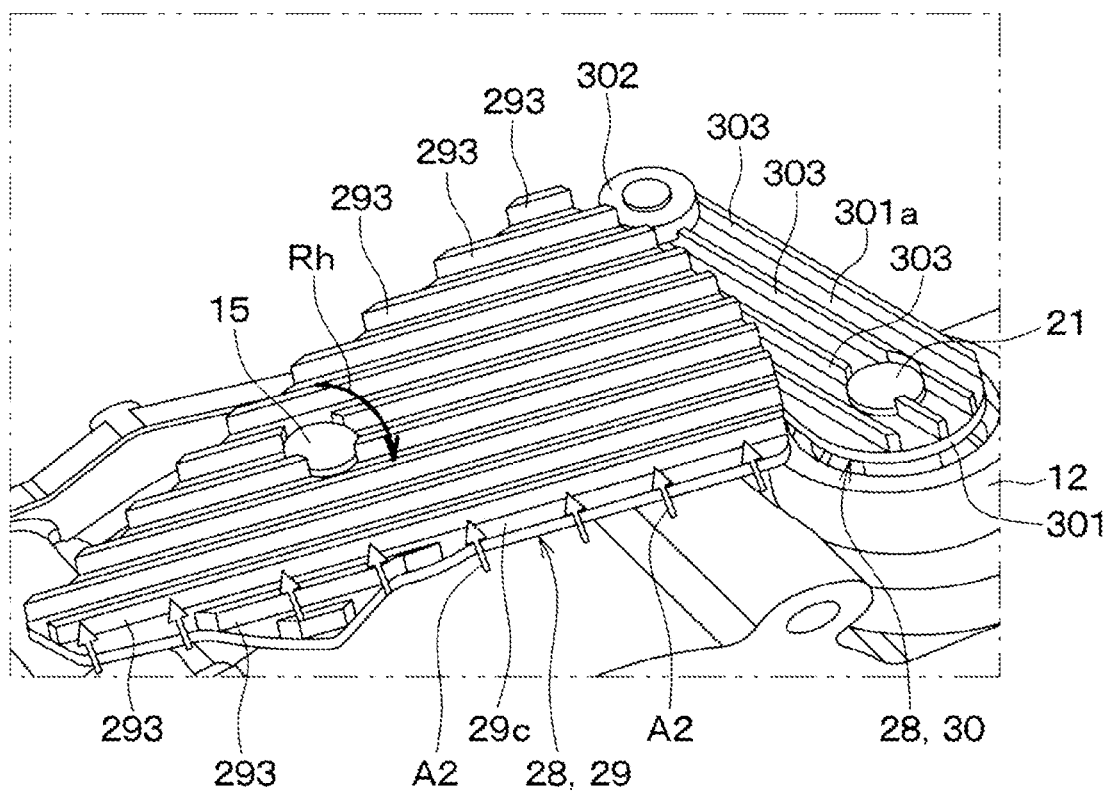
FIG. 9 is a perspective view illustrating an interlocking portion and its periphery in an extracted manner in a fifth embodiment and corresponding to FIG. 8.

As illustrated in FIG. 9, in the present embodiment, the cam 29 includes a plurality of cam projections 293, and the lever 301 of the driven rotating portion 30 includes a plurality of driven projections 303. The cam projections 293 are provided on a one side surface 29c of the cam 29 that is formed on one side in the valve shaft direction Da (see FIG. 3), and project from the one side surface 29c to one side in the valve shaft direction Da. The cam projections 293 are arranged in parallel with each other at intervals, and extend along the one side surface 29c of the cam 29.

The driven projections 303 are provided on a one side surface 301a of the lever 301 that is formed on one side in the valve shaft direction Da, and project from the one side surface 301a to one side in the valve shaft direction Da. The driven projections 303 are arranged in parallel with each other at intervals, and extend along the one side surface 301a of the lever 301. The one side surface 29c of the cam 29 corresponds to a surface of a cam in the present disclosure, and the one side surface 301a of the lever 301 corresponds to a surface of a driven rotating portion in the present disclosure.

(1) The cam projections 293 and the driven projections 303 are provided as described above, and thus it is possible to increase the surface area of a portion that comes into contact with air when the valve is operated. As a result, it is possible to enhance the cooling effect of dissipating the heat of the valve device 10 to the outside.

For example, when the cam 29 rotates together with the EGR valve shaft 15 as indicated by an arrow Rh, an air flow A2 is generated relatively to the cam projections 293 and the air flow A2 hits the cam projections 293, so that heat dissipation from the cam 29 is promoted. The same applies to a case where the lever 301 rotates, and heat dissipation from the lever 301 is promoted.

The present embodiment is similar to the first embodiment except for the above description. In the present embodiment, the same effects as those of the first embodiment can be obtained from the same configuration as that of the first embodiment.

Sixth Embodiment

Next, a sixth embodiment will be described. The present embodiment will mainly describe differences from the first embodiment.

Figure 10:
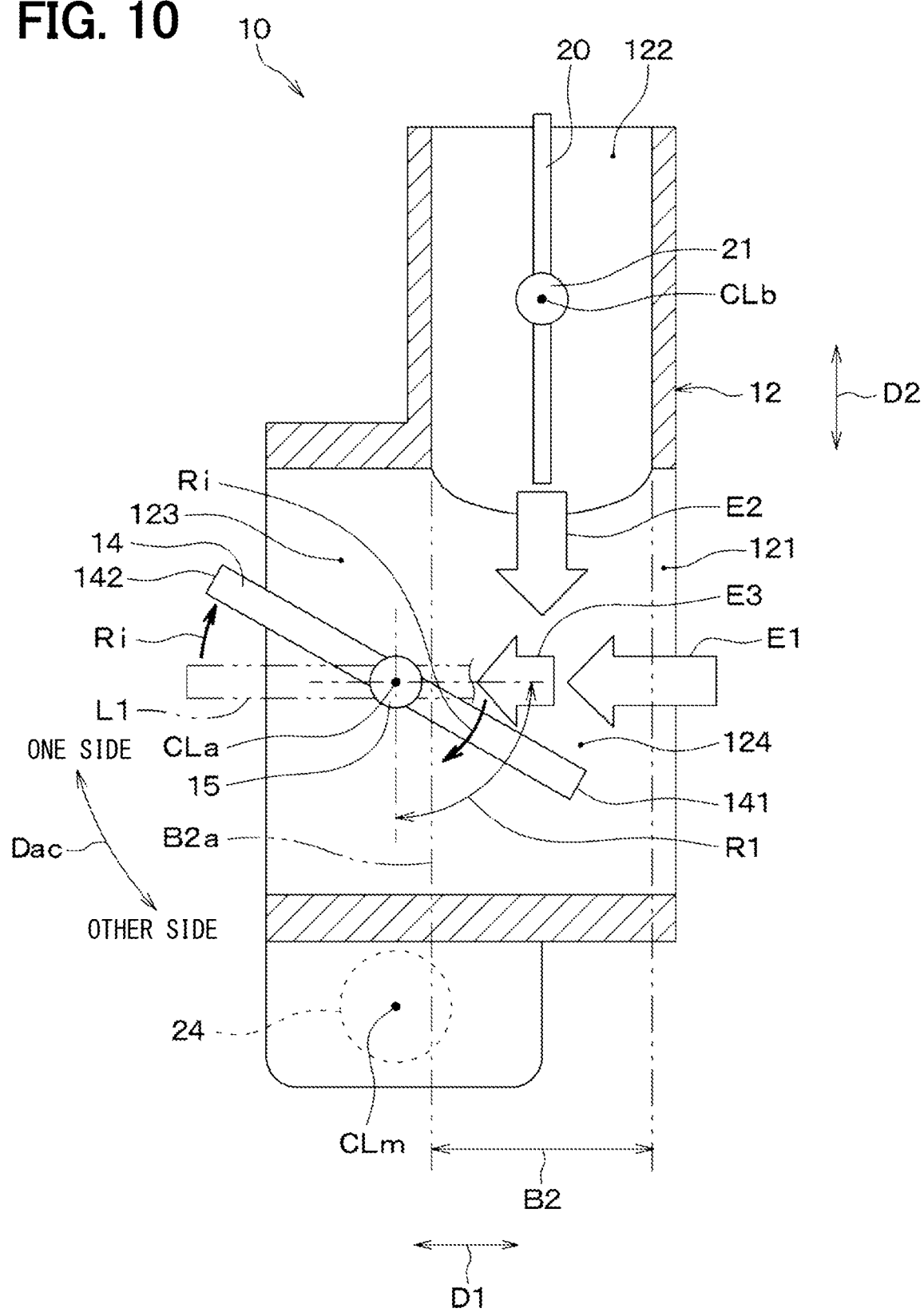
FIG. 10 is a cross-sectional view of a valve device schematically illustrating a cross-section corresponding to FIG. 4 in a sixth embodiment, and is a diagram illustrating a state where an EGR valve body rotates from a fully open state of a downstream passage to one side in an EGR valve circumferential direction.

As illustrated in FIG. 10, the EGR valve body 14 includes a one side end 141 that is provided on one side in an EGR valve body lateral direction, which is a direction perpendicular to the EGR valve axis CLa and along the EGR valve body 14 with a flat plate shape, and an other side end 142 provided on the other side in the EGR valve body lateral direction. In the present embodiment, this is similar to the first embodiment.

An extended space B2 is assumed. The extended space B2 is obtained by virtually extending the second upstream passage 122 along the direction of the second upstream passage 122. In this case, in a state where the EGR valve body 14 fully opens the downstream passage 123, the one side end 141 of the EGR valve body 14 is located on the gas-flow upstream side of a side edge B2a of the extended space B2 on the side of the downstream passage 123. The state where the EGR valve body 14 fully opens the downstream passage 123 is a state where the EGR valve body 14 is at the reference rotational position. In the present embodiment, this is also similar to the first embodiment. In FIG. 10, a part of the EGR valve body 14 at the reference rotational position is indicated by a two-dot chain line L1.

However, in the present embodiment, the rotational direction when the EGR valve body 14 rotates in a direction to close the downstream passage 123 is indicated by an arrow Ri, and the rotational direction when the EGR valve body 14 rotates in a direction to open the downstream passage 123 is opposite to the arrow Ri. In this respect, the present embodiment is different from the first embodiment.

Specifically, in the present embodiment, the motor 24 always rotates the EGR valve body 14 as indicated by the arrow Ri when rotating the EGR valve body 14 in the direction to close the downstream passage 123 from a state where the EGR valve body 14 fully opens the downstream passage 123. That is, in a case where the one side end 141 illustrated in FIG. 10 is located on the gas-flow upstream side of the side edge B2a, when rotating the EGR valve body 14 in the direction to close the downstream passage 123, the motor 24 always rotates the EGR valve body 14 in a direction in which the one side end 141 is moved away from the second upstream passage 122.

On the other hand, when rotating the EGR valve body 14 in the direction to open the downstream passage 123 toward the full open state of the downstream passage 123, the motor 24 always rotates the EGR valve body 14 in the direction opposite to the arrow Ri. That is, in a case where the one side end 141 illustrated in FIG. 10 is located on the gas-flow upstream side of the side edge B2a, when rotating the EGR valve body 14 in the direction to open the downstream passage 123, the motor 24 always rotates the EGR valve body 14 in a direction in which the one side end 141 approaches the second upstream passage 122.

In other words, when rotating the EGR valve body 14 from the reference rotational position in the direction to close the downstream passage 123, the motor 24 rotates the EGR valve body 14 to one side in the EGR valve circumferential direction Dac. When rotating the EGR valve body 14 from the reference rotational position in the direction to close the downstream passage 123, the motor 24 does not rotate the EGR valve body 14 from the reference rotational position in the other side of the EGR valve circumferential direction Dac.

In the present embodiment, as the EGR valve body 14 rotates to one side in the EGR valve circumferential direction Dac from the fully open state of the downstream passage 123, the opening degree of the downstream passage 123 decreases while the one side end 141 is moved away from the second upstream passage 122. The motor 24 then rotates the EGR valve body 14 within a rotational range R1 from a fully-closed rotational position at which the EGR valve body fully closes the downstream passage 123 to a rotational position at which the EGR valve body 14 rotates 90 degrees to the other side in the EGR valve circumferential direction Dac.

Since the EGR valve body 14 is rotationally operated as described above, the EGR gas that is cooled by the EGR cooler 80 and flows as indicated by an arrow E1 does not directly hit the EGR valve body 14. That is, the EGR gas cooled and flowing as indicated by the arrow E1 is mixed with the EGR gas bypassing the EGR cooler 80 and flowing as indicated by an arrow E2 to rise in temperature, and then hits the EGR valve body 14 as indicated by an arrow E3. The EGR valve body 14 is thus hardly cooled.

As a result, it is possible to suppress generation of condensed water due to high-temperature and high-humidity EGR gas hitting the EGR valve body 14. As the EGR valve axis CLa is disposed close to the junction 124 to reduce the interval between the EGR valve body 14 and the bypass valve body 20 while the generation of condensed water is suppressed, the valve device 10 can be downsized.

Figure 11:
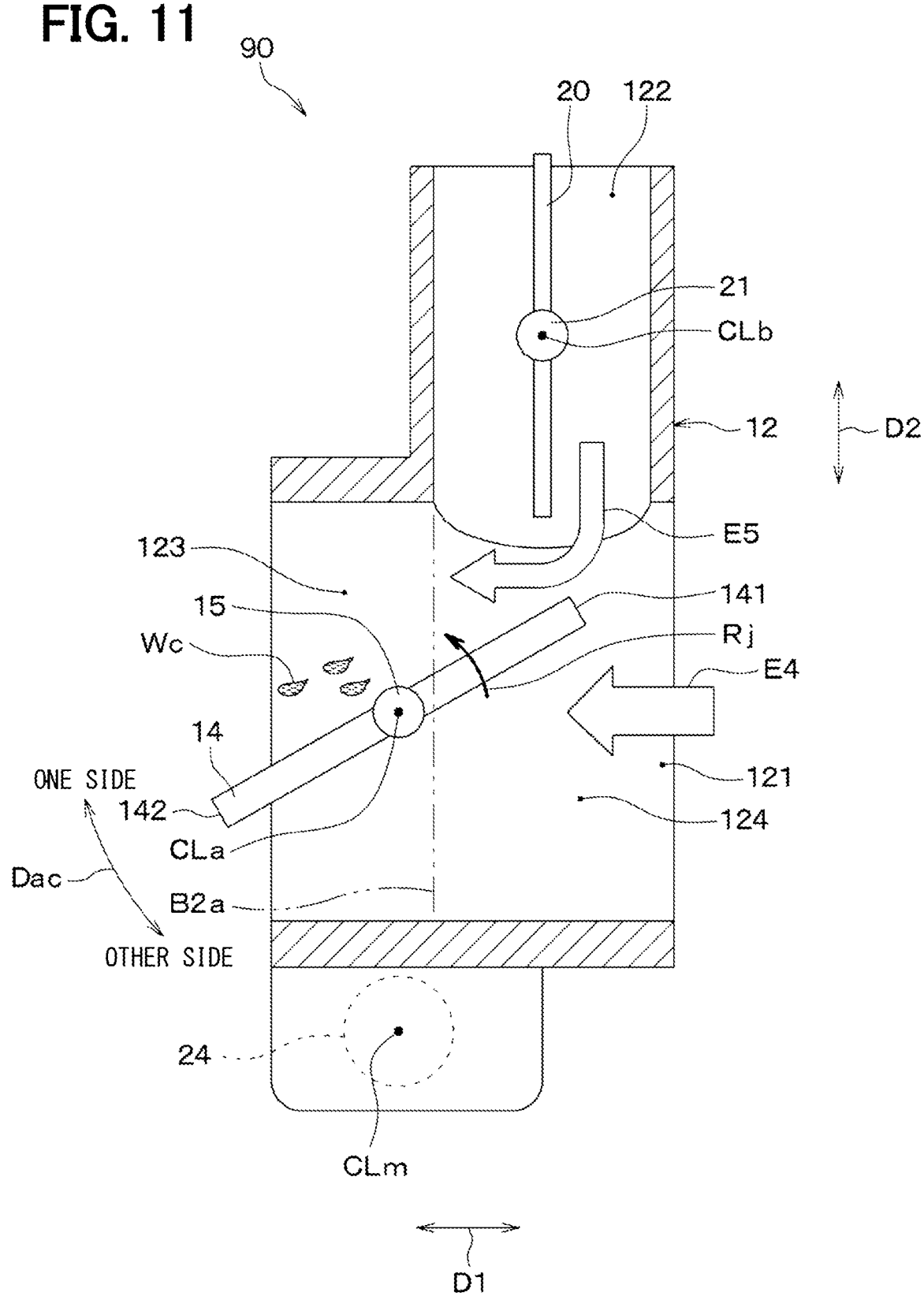
FIG. 11 is a cross-sectional view schematically illustrating a cross-section corresponding to FIG. 10 in a first comparative example.

Here, in order to explain the reason why the generation of condensed water is suppressed in the present embodiment, a first comparative example illustrated in FIG. 11 is used. In a valve device 90 of the first comparative example, as illustrated in FIG. 11, the EGR valve body 14 rotates in a direction opposite to the direction in the present embodiment from the fully open state of the downstream passage 123.

Specifically, in the first comparative example, the motor 24 always rotates the EGR valve body 14 as indicated by an arrow Rj when rotating the EGR valve body 14 in the direction to close the downstream passage 123 from a state where the EGR valve body 14 fully opens the downstream passage 123. That is, in a case where the one side end 141 illustrated in FIG. 11 is located on the gas-flow upstream side of the side edge B2a, when rotating the EGR valve body 14 in the direction to close the downstream passage 123, the motor 24 always rotates the EGR valve body 14 in a direction in which the one side end 141 approaches the second upstream passage 122.

On the other hand, when rotating the EGR valve body 14 in the direction to open the downstream passage 123 toward the full open state of the downstream passage 123, the motor 24 of the first comparative example always rotates the EGR valve body 14 in the direction opposite to the arrow Rj. That is, in a case where the one side end 141 illustrated in FIG. 11 is located on the gas-flow upstream side of the side edge B2a, when rotating the EGR valve body 14 in the direction to open the downstream passage 123, the motor 24 always rotates the EGR valve body 14 in a direction in which the one side end 141 is moved away from the second upstream passage 122. The first comparative example is similar to the present embodiment except for these points.

In the first comparative example, as illustrated in FIG. 11, the EGR valve body 14 is likely to be in an attitude that prevents the EGR gas cooled by the EGR cooler 80 and flowing as indicated by an arrow E4 from being mixed with the EGR gas bypassing the EGR cooler 80 and flowing as indicated by an arrow E5. The EGR gas cooled by the EGR cooler 80 and flowing as indicated by the arrow E4 often directly hits the EGR valve body 14, and thus the EGR valve body 14 is easily cooled. As a result, condensed water We is likely to be generated due to the high-temperature and high-humidity EGR gas hitting the EGR valve body 14 cooled.

On the other hand, in the present embodiment, as described above, the EGR valve body 14 is less likely to be cooled as compared with the first comparative example, and thus it is possible to suppress generation of condensed water due to the high-temperature and high-humidity EGR gas hitting the EGR valve body 14.

Since the direction in which the EGR valve body 14 is rotationally operated is limited as described above in the present embodiment, various configurations of the valve device 10 are also changed in accordance with this limitation. For example, the EGR valve urging portion 16 (see FIG. 3) of the present embodiment constantly urges the EGR valve body 14 not to one side but to the other side in the circumferential direction Dac of the EGR valve axis CLa. In addition, the shape of the cam 29 of the interlocking portion 28 is not similar to that in the first embodiment, and the cam 29 is formed in accordance with a direction in which the EGR valve body 14 is rotationally operated.

In the present embodiment, the first upstream passage 121 corresponds to one passage of the present disclosure, and the second upstream passage 122 corresponds to the other passage of the present disclosure.

The present embodiment is similar to the first embodiment except for the above description. In the present embodiment, the same effects as those of the first embodiment can be obtained from the same configuration as that of the first embodiment.

Although the present embodiment is a modification based on the first embodiment, the present embodiment can be combined with any of the second to fifth embodiments described above.

Seventh Embodiment

Next, a seventh embodiment will be described. The present embodiment will mainly describe differences from the first embodiment.

As illustrated in FIG. 12, the present embodiment is different from the first embodiment in the arrangement of the first upstream passage 121, the second upstream passage 122, and the bypass valve body 20.

Specifically, in the present embodiment, the second upstream passage 122, the junction 124, and the downstream passage 123 are connected in series from the gas-flow upstream side in the order of the second upstream passage 122, the junction 124, and the downstream passage 123 along the first passage direction D1, and form one linearly extending passage. That is, the direction of the second upstream passage 122 and the direction of the downstream passage 123 are the same, and both are the first passage direction D1. The second upstream passage 122 is connected in series to the downstream passage 123 via the junction 124.

The first upstream passage 121 linearly extends along the second passage direction D2. That is, the direction of the first upstream passage 121 is the second passage direction D2, and the first upstream passage 121 is disposed in a direction intersecting the second upstream passage 122 and the downstream passage 123. The first upstream passage 121 is connected to the downstream passage 123 via the junction 124. Also in the present embodiment, the second passage direction D2 is a direction intersecting the first passage direction D1, strictly speaking, a direction perpendicular to the first passage direction D1, as in the first embodiment.

The bypass valve body 20 of the present embodiment is disposed in the second upstream passage 122 and rotates around the bypass valve axis CLb parallel to the EGR valve axis CLa, as in the first embodiment. The bypass valve axis CLb, which is the rotation center of the bypass valve body 20, is arranged side by side in the first passage direction D1 with the EGR valve axis CLa, which is the rotation center of the EGR valve body 14. The bypass valve shaft 21 is also arranged side by side with the EGR valve shaft 15 in the first passage direction D1.

The EGR valve body 14 of the present embodiment is disposed away from the junction 124 without entering the junction 124.

Since the present embodiment is different from the first embodiment in the relative positional relationship between the EGR valve axis CLa and the Bypass valve axis CLb as described above, various configurations of the valve device 10 are also changed in accordance with this difference. For example, the shape of the cam 29 (see FIG. 2) of the interlocking portion 28 is not similar to that in the first embodiment, and the cam 29 is formed in accordance with the relative positional relationship between the EGR valve axis CLa and the bypass valve axis CLb.

The present embodiment is similar to the first embodiment except for the above description. In the present embodiment, the same effects as those of the first embodiment can be obtained from the same configuration as that of the first embodiment.

Although the present embodiment is a modification based on the first embodiment, the present embodiment can be combined with any of the second to fifth embodiments described above.

Eighth Embodiment

Next, an eighth embodiment will be described. The present embodiment will mainly describe differences from the seventh embodiment.

Figure 13:
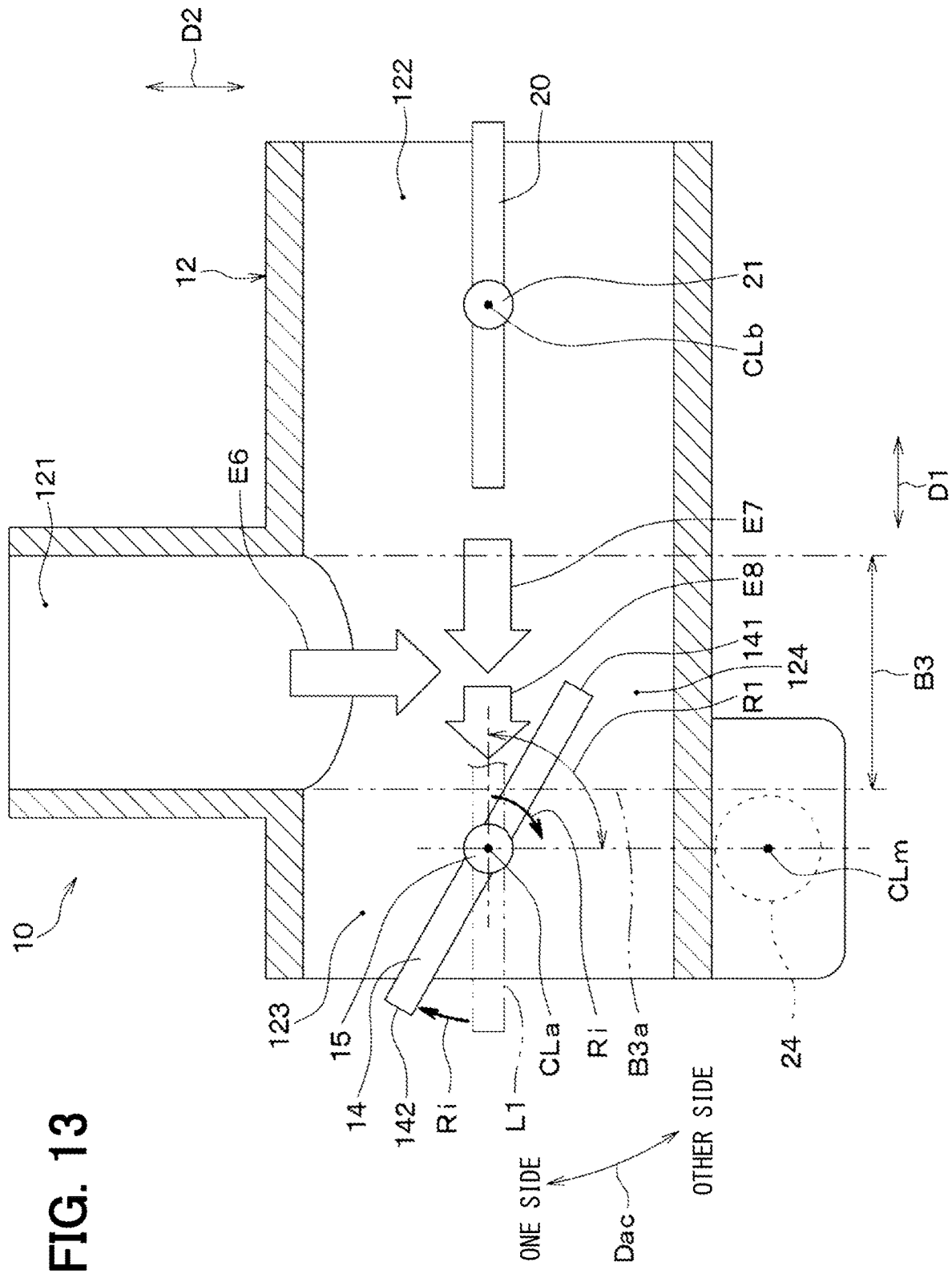
FIG. 13 is a cross-sectional view of a valve device schematically illustrating a state where an EGR valve body rotates from a fully open state of a downstream passage to one side in the EGR valve circumferential direction in an eighth embodiment and corresponding to FIG. 10.

As illustrated in FIG. 13, the present embodiment is an embodiment obtained by combining the seventh embodiment with the sixth embodiment. Specifically, the EGR valve body 14 of the present embodiment includes the one side end 141 and the other side end 142 as in the sixth embodiment. In the present embodiment, this is similar to the seventh embodiment.

An extended space B3 is assumed. The extended space B3 is obtained by virtually extending the first upstream passage 121 along the direction of the first upstream passage 121 (that is, the second passage direction D2). In this case, in a state where the EGR valve body 14 fully opens the downstream passage 123, the one side end 141 of the EGR valve body 14 is located on the gas-flow upstream side of a side edge B3a of the extended space B3 on the side of the downstream passage 123. In this respect, the present embodiment is different from the seventh embodiment. The state where the EGR valve body 14 fully opens the downstream passage 123 is a state where the EGR valve body 14 is at the reference rotational position as in the seventh embodiment. Also in FIG. 13, a part of the EGR valve body 14 at the reference rotational position is indicated by the two-dot chain line L1, similarly to FIG. 10.

In the present embodiment, the rotational direction when the EGR valve body 14 rotates in a direction to close the downstream passage 123 is indicated by the arrow Ri, and the rotational direction when the EGR valve body 14 rotates in a direction to open the downstream passage 123 is opposite to the arrow Ri.

Specifically, in the present embodiment, the motor 24 always rotates the EGR valve body 14 as indicated by the arrow Ri when rotating the EGR valve body 14 in the direction to close the downstream passage 123 from a state where the EGR valve body 14 fully opens the downstream passage 123. That is, in a case where the one side end 141 illustrated in FIG. 13 is located on the gas-flow upstream side of the side edge B3a, when rotating the EGR valve body 14 in the direction to close the downstream passage 123, the motor 24 always rotates the EGR valve body 14 in a direction in which the one side end 141 is moved away from the first upstream passage 121.

On the other hand, when rotating the EGR valve body 14 in the direction to open the downstream passage 123 toward the full open state of the downstream passage 123, the motor 24 always rotates the EGR valve body 14 in the direction opposite to the arrow Ri. That is, in a case where the one side end 141 illustrated in FIG. 13 is located on the gas-flow upstream side of the side edge B3a, when rotating the EGR valve body 14 in the direction to open the downstream passage 123, the motor 24 always rotates the EGR valve body 14 in a direction in which the one side end 141 approaches the first upstream passage 121.

In other words, when rotating the EGR valve body 14 from the reference rotational position in the direction to close the downstream passage 123, the motor 24 rotates the EGR valve body 14 to one side in the EGR valve circumferential direction Dac. When rotating the EGR valve body 14 from the reference rotational position in the direction to close the downstream passage 123, the motor 24 does not rotate the EGR valve body 14 from the reference rotational position in the other side of the EGR valve circumferential direction Dac.

In the present embodiment, as the EGR valve body 14 rotates to one side in the EGR valve circumferential direction Dac from the fully open state of the downstream passage 123, the opening degree of the downstream passage 123 decreases while the one side end 141 is moved away from the first upstream passage 121. The motor 24 then rotates the EGR valve body 14 within a rotational range R1 from a fully-closed rotational position at which the EGR valve body fully closes the downstream passage 123 to a rotational position at which the EGR valve body 14 rotates 90 degrees to the other side in the EGR valve circumferential direction Dac.

Since the EGR valve body 14 is rotationally operated as described above, the EGR gas that is cooled by the EGR cooler 80 (see FIG. 12) and flows as indicated by an arrow E6 does not directly hit the EGR valve body 14. That is, the EGR gas cooled and flowing as indicated by the arrow E6 is mixed with the EGR gas bypassing the EGR cooler 80 and flowing as indicated by an arrow E7 to rise in temperature, and then hits the EGR valve body 14 as indicated by an arrow E8. The EGR valve body 14 is thus hardly cooled.

Also in the present embodiment, it is possible to suppress generation of condensed water due to high-temperature and high-humidity EGR gas hitting the EGR valve body 14, as in the sixth embodiment. As the EGR valve axis CLa is disposed close to the junction 124 to reduce the interval between the EGR valve body 14 and the bypass valve body 20 while the generation of condensed water is suppressed, the valve device 10 can be downsized.

Figure 14:
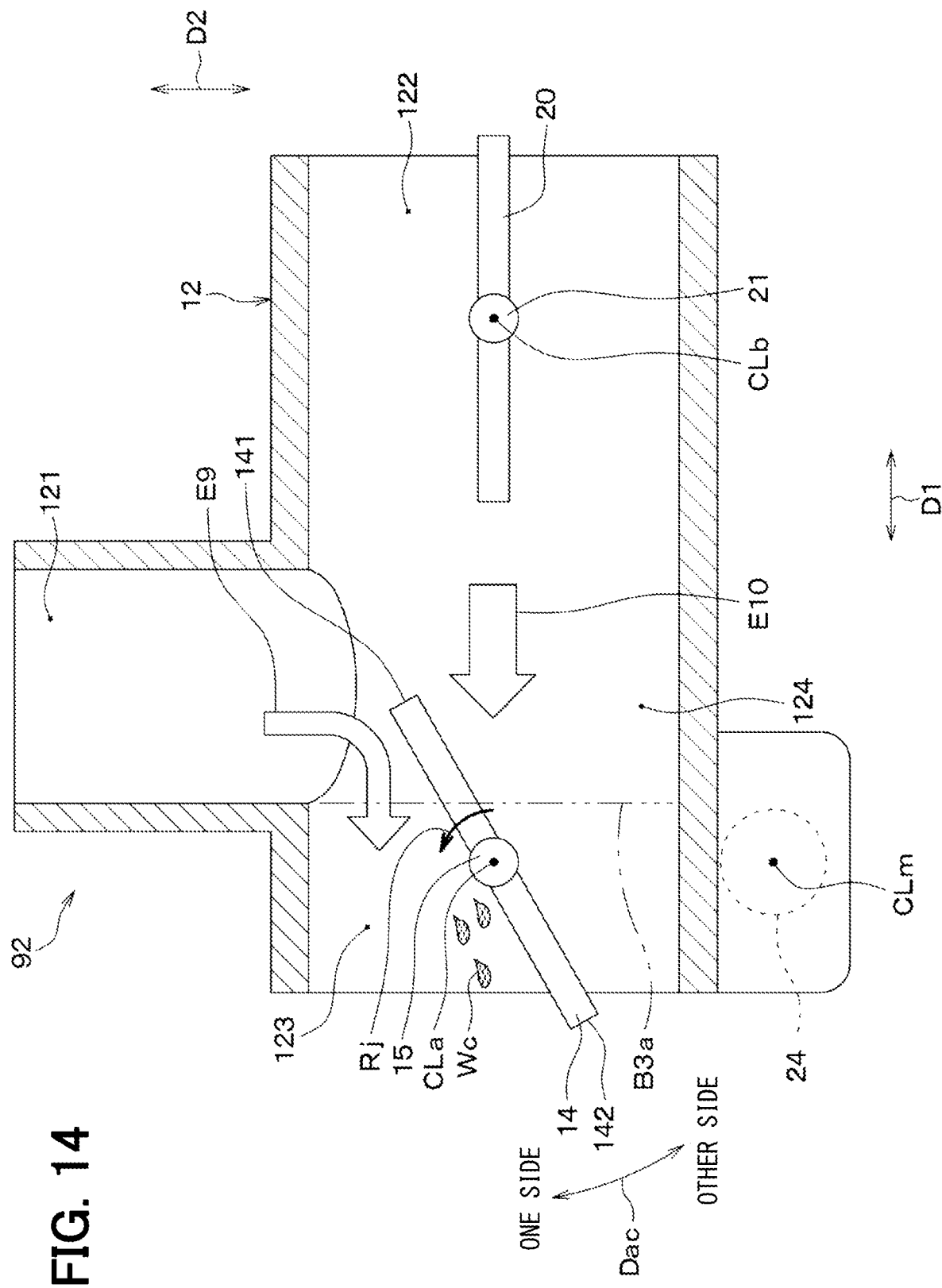
FIG. 14 is a cross-sectional view schematically illustrating a cross-section corresponding to FIG. 13 in a second comparative example.

Here, in order to explain the reason why the generation of condensed water is suppressed in the present embodiment, a second comparative example illustrated in FIG. 14 is used. In a valve device 92 of the second comparative example, as illustrated in FIG. 14, the EGR valve body 14 rotates in a direction opposite to the direction in the present embodiment from the fully open state of the downstream passage 123.

Specifically, in the second comparative example, the motor 24 always rotates the EGR valve body 14 as indicated by the arrow Rj when rotating the EGR valve body 14 in the direction to close the downstream passage 123 from a state where the EGR valve body 14 fully opens the downstream passage 123, as in the first comparative example in FIG. 11.

On the other hand, when rotating the EGR valve body 14 in the direction to open the downstream passage 123 toward the full open state of the downstream passage 123, the motor 24 of the second comparative example always rotates the EGR valve body 14 in the direction opposite to the arrow Rj, as in the first comparative example in FIG. 11. The second comparative example is similar to the present embodiment except for these points.

In the second comparative example, as illustrated in FIG. 14, the EGR valve body 14 is likely to be in an attitude that prevents the EGR gas cooled by the EGR cooler 80 and flowing as indicated by an arrow E9 from being mixed with the EGR gas bypassing the EGR cooler 80 and flowing as indicated by an arrow E10. Also in the second comparative example, the EGR gas cooled by the EGR cooler 80 and flowing as indicated by the arrow E9 often directly hits the EGR valve body 14, and thus the EGR valve body 14 is easily cooled, as in the first comparative example. As a result, the condensed water We is likely to be generated due to the high-temperature and high-humidity EGR gas hitting the EGR valve body 14 cooled.

On the other hand, in the present embodiment, as described above, the EGR valve body 14 is less likely to be cooled as compared with the second comparative example, and thus it is possible to suppress generation of condensed water due to the high-temperature and high-humidity EGR gas hitting the EGR valve body 14.

Since the direction in which the EGR valve body 14 is rotationally operated is limited as described above in the present embodiment, various configurations of the valve device 10 are also changed in accordance with this limitation. For example, the EGR valve urging portion 16 (see FIG. 3) of the present embodiment constantly urges the EGR valve body 14 not to one side but to the other side in the circumferential direction Dac of the EGR valve axis CLa. In addition, the shape of the cam 29 of the interlocking portion 28 is not similar to that in the seventh embodiment, and the cam 29 is formed in accordance with a direction in which the EGR valve body 14 is rotationally operated.

In the present embodiment, the first upstream passage 121 corresponds to the other passage of the present disclosure, and the second upstream passage 122 corresponds to one passage of the present disclosure.

The present embodiment is similar to the seventh embodiment except for the above description. In the present embodiment, the same effects as those of the seventh embodiment can be obtained from the same configuration as that of the seventh embodiment.

Other Embodiments (1) In each of the embodiments described above, the fuel used in the internal combustion engine system 70 illustrated in FIG. 1 is hydrogen, but this is an example. The internal combustion engine system 70 may use, for example, fossil fuel such as gasoline as fuel for generating power.

(2) In the third embodiment described above, as illustrated in FIG. 7, the driven gear 36 is directly meshed with the drive gear 35, but this is an example. For example, an intermediate gear may be additionally provided between the drive gear 35 and the driven gear 36, and the driven gear 36 may be indirectly meshed with the drive gear 35 via the intermediate gear.

(3) In the first embodiment described above, as illustrated in FIG. 5, the motor axis CLm is arranged side by side with the EGR valve axis CLa in the second passage direction D2, but the arrangement of the motor 24 is not limited thereto. It is only required that the motor 24 and the bypass valve body 20 are disposed to be opposite to each other with the junction 124 being interposed therebetween, and as illustrated in FIG. 15, for example, the motor 24 may be disposed at a position indicated by a two-dot chain line M1. Alternatively, the motor 24 may be disposed at a position indicated by a two-dot chain line M2.

(4) In the seventh embodiment described above, as illustrated in FIG. 12, the motor 24 is disposed on the side of the downstream passage 123 opposite to the side at which the first upstream passage 121 is provided in the second passage direction D2, but this is an example. For example, the motor 24 may be disposed at a position indicated by a two-dot chain line M3 in FIG. 12. That is, the motor 24 may be disposed on the side of the downstream passage 123 at which the first upstream passage 121 is provided in the second passage direction D2. Even with this arrangement of the motor 24, the motor 24 and the bypass valve body 20 are disposed to be opposite to each other with the junction 124 interposed therebetween.

(5) In the first embodiment described above, as illustrated in FIG. 2, the cam track 291 includes a part of the peripheral edge of the cam 29, but may include, for example, a groove or a long hole provided in the cam 29 instead of the peripheral edge of the cam 29.

(6) The present disclosure is not limited to the embodiments described above, and various modifications can be made. In addition, the embodiments described above are not unrelated to each other, and can be appropriately combined unless the combination is obviously impossible.

In addition, in each of the above embodiments, it goes without saying that the elements constituting the embodiments are not necessarily essential except for a case where it is explicitly stated that the elements are particularly essential and a case where the elements are considered to be obviously essential in principle. In each of the above embodiments, when a numerical value such as the number, numerical value, amount, range, or the like of the constituent elements of the embodiment is mentioned, the numerical value is not limited to a specific number unless otherwise specified as essential or obviously limited to the specific number in principle. In each of the above embodiments, when the material, shape, positional relationship, and the like of the constituent elements and the like are referred to, the material, the shape, the positional relationship, and the like are not limited unless otherwise specified or limited to specific materials, shapes, positional relationships, and the like in principle.

What is claimed is:

1. A valve device that increases or decreases a flow rate of EGR gas, the valve device comprising:
   a housing that includes
      a first upstream passage into which the EGR gas cooled by an EGR cooler flows,
      a second upstream passage into which the EGR gas that bypasses the EGR cooler flows,
      a junction connected to each of a gas-flow downstream of the first upstream passage and a gas-flow downstream of the second upstream passage, and
      a downstream passage connected to the first upstream passage and the second upstream passage via the junction;
   a bypass valve body that is provided in the second upstream passage and opens and closes the second upstream passage;
   an EGR valve body that is provided in the downstream passage and rotates around an EGR valve axis to open and close the downstream passage;
   a motor that rotationally drives the EGR valve body; and
   an interlocking portion that interlocks the bypass valve body with a rotational operation of the EGR valve body, wherein
   the motor and the bypass valve body are disposed opposite to each other with the junction between the motor and the bypass valve body,
   wherein
   the bypass valve body rotates around a bypass valve axis to open and close the second upstream passage,
   the interlocking portion includes a cam that rotates with the EGR valve body and has a cam track, and a driven rotating portion that rotates with the bypass valve body and has a cam follower, the driven rotating portion rotates in an interlocking manner with a rotational operation of the cam while causing the cam follower to follow the cam track, the cam is fixed to an EGR valve shaft to integrally rotate with the EGR valve body around the EGR valve axis, and the cam includes a cam through-hole.

2. The valve device according to claim 1, wherein a rotation center of the motor is parallel to the EGR valve axis, and the rotation center of the motor and the EGR valve axis are aligned in a direction perpendicular to a direction of the downstream passage.

3. The valve device according to claim 1, wherein the second upstream passage is a passage linearly extending along a second passage direction; and the motor and the bypass valve body are positioned on opposite sides of EGR valve axis along the second passage direction such that the EGR valve axis is positioned between the motor and bypass valve body along the second passage direction.

4. The valve device according to claim 1, wherein the bypass valve axis is parallel to the EGR valve axis;

the second upstream passage is a passage linearly extending along a second passage direction; and the motor and the bypass valve body are positioned on opposite sides of EGR valve axis along the second passage direction such that the EGR valve axis is positioned between the motor and bypass valve body along the second passage direction.

\* \* \* \* \*